United States Patent
Christopher et al.

(10) Patent No.: US 12,171,048 B2
(45) Date of Patent: Dec. 17, 2024

(54) METHODS AND SYSTEMS FOR ALLOCATING TELEPHONE NUMBERS

(71) Applicant: Comcast Cable Communications, LLC, Philadelphia, PA (US)

(72) Inventors: Matthew J. Christopher, Highlands Ranch, CO (US); Raghavendra P. Hegde, Wayne, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/087,324

(22) Filed: Nov. 2, 2020

(65) Prior Publication Data

US 2022/0141650 A1    May 5, 2022

(51) Int. Cl.
*H04W 8/26* (2009.01)
*H04W 8/00* (2009.01)

(52) U.S. Cl.
CPC .............. *H04W 8/26* (2013.01); *H04W 8/00* (2013.01)

(58) Field of Classification Search
CPC ......... H04W 8/26; H04W 8/265; H04W 8/00; H04W 8/02; H04M 3/42; H04L 67/02
See application file for complete search history.

(56) References Cited

U.S. PATENT DOCUMENTS

| | | | | |
|---|---|---|---|---|
| 9,967,230 | B2* | 5/2018 | Akef | H04L 65/1069 |
| 10,171,653 | B1* | 1/2019 | Varman | H04M 3/5158 |
| 10,341,498 | B2* | 7/2019 | Kahn | H04M 15/751 |
| 11,146,677 | B1* | 10/2021 | Varman | H04W 4/16 |
| 2011/0255679 | A1* | 10/2011 | Gudlavenkatasiva | H04Q 3/625 379/201.02 |
| 2013/0102274 | A1* | 4/2013 | Lauwaert | G06Q 30/0242 455/405 |
| 2015/0312407 | A1* | 10/2015 | Hegde | G06Q 30/016 379/142.1 |
| 2017/0359469 | A1* | 12/2017 | Chau | H04W 4/16 |
| 2018/0139589 | A1* | 5/2018 | Hangsleben | H04M 1/72463 |
| 2018/0234817 | A1* | 8/2018 | Hunt | H04W 76/10 |
| 2018/0248843 | A1* | 8/2018 | Akef | H04L 61/5076 |
| 2018/0352078 | A1* | 12/2018 | Jung | H04W 4/16 |
| 2019/0334976 | A1* | 10/2019 | Kothari | H04L 67/02 |
| 2019/0379787 | A1* | 12/2019 | Ting | H04L 61/5061 |
| 2020/0045183 | A1* | 2/2020 | Voloshin | H04M 3/2227 |

* cited by examiner

Primary Examiner — Khawar Iqbal
(74) Attorney, Agent, or Firm — Ballard Spahr LLP

(57) ABSTRACT

A telephone number (TN) from a group of telephone numbers may be assigned/allocated to a user device (e.g., an internet-of-things (IoT) device, a computing device, a sensor, a smart meter, a tablet, a network device, a session initiation protocol (SIP) device, a web real-time communication (webRTC) enabled device, and/or any other device that is configured for communication (e.g., voice communication, video communication, signal communication, etc.) for a time period (e.g., the duration of timer, etc.) during which the TN may be used to make and/or receive calls. Once the time period expires the TN may be placed in a group of telephone numbers available to be assigned/reassigned to user devices.

20 Claims, 15 Drawing Sheets

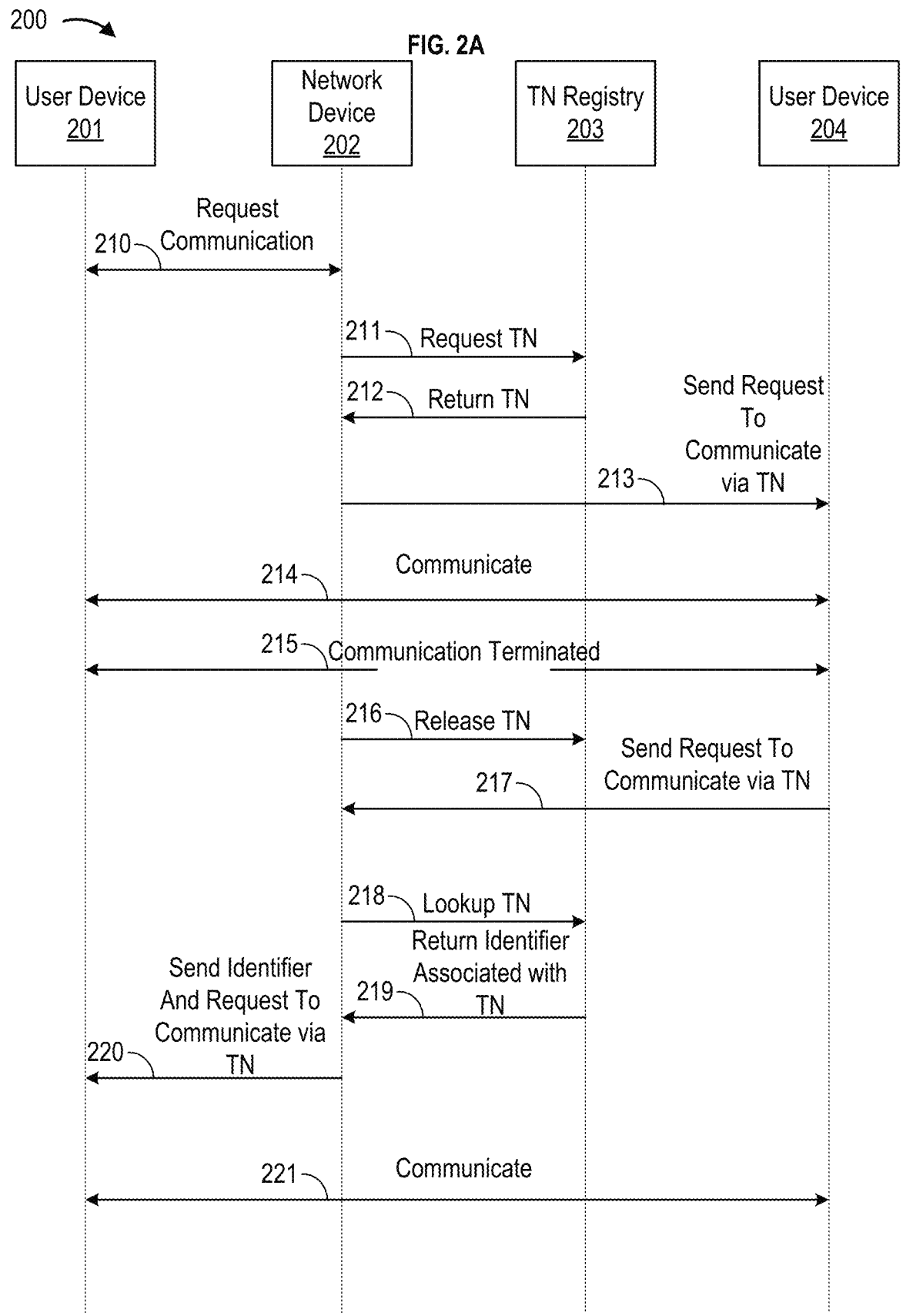

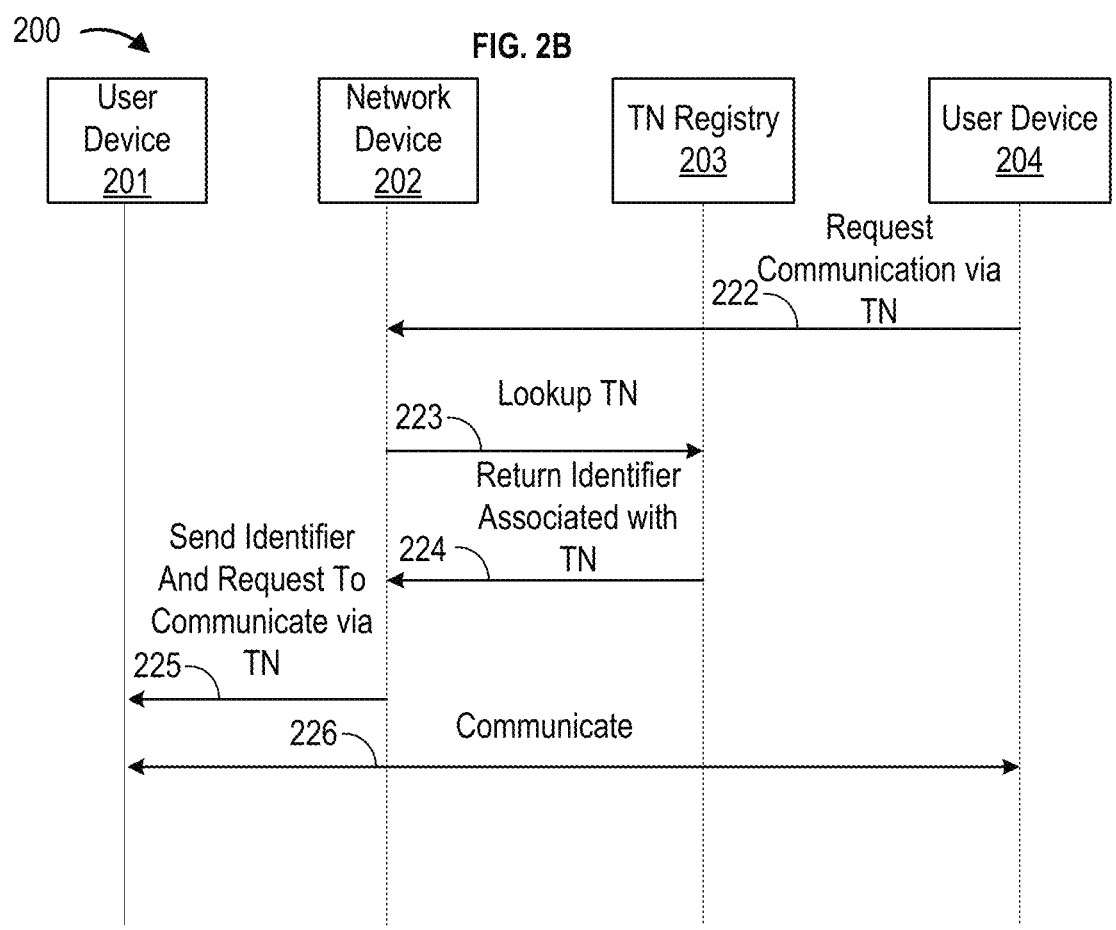

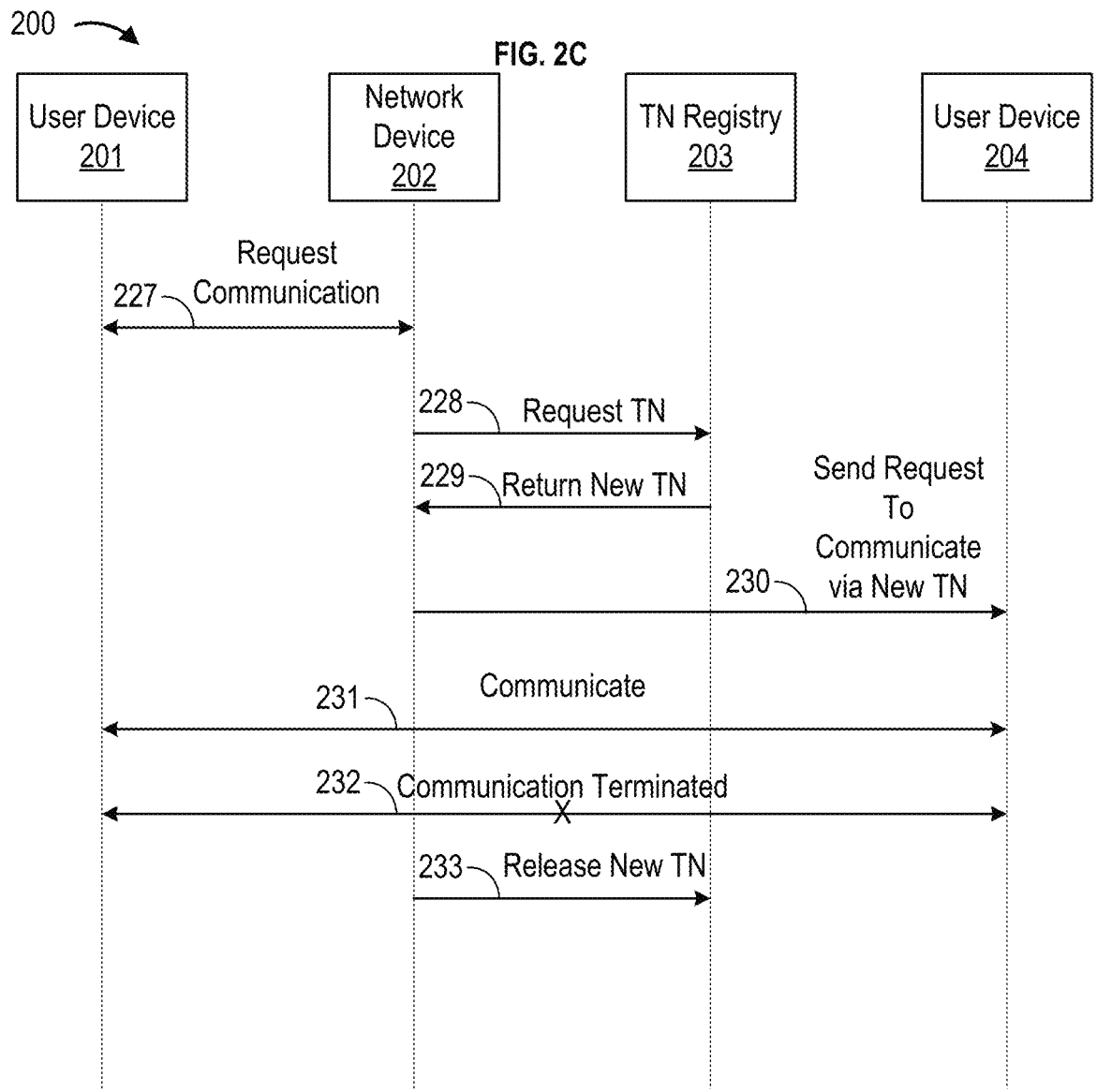

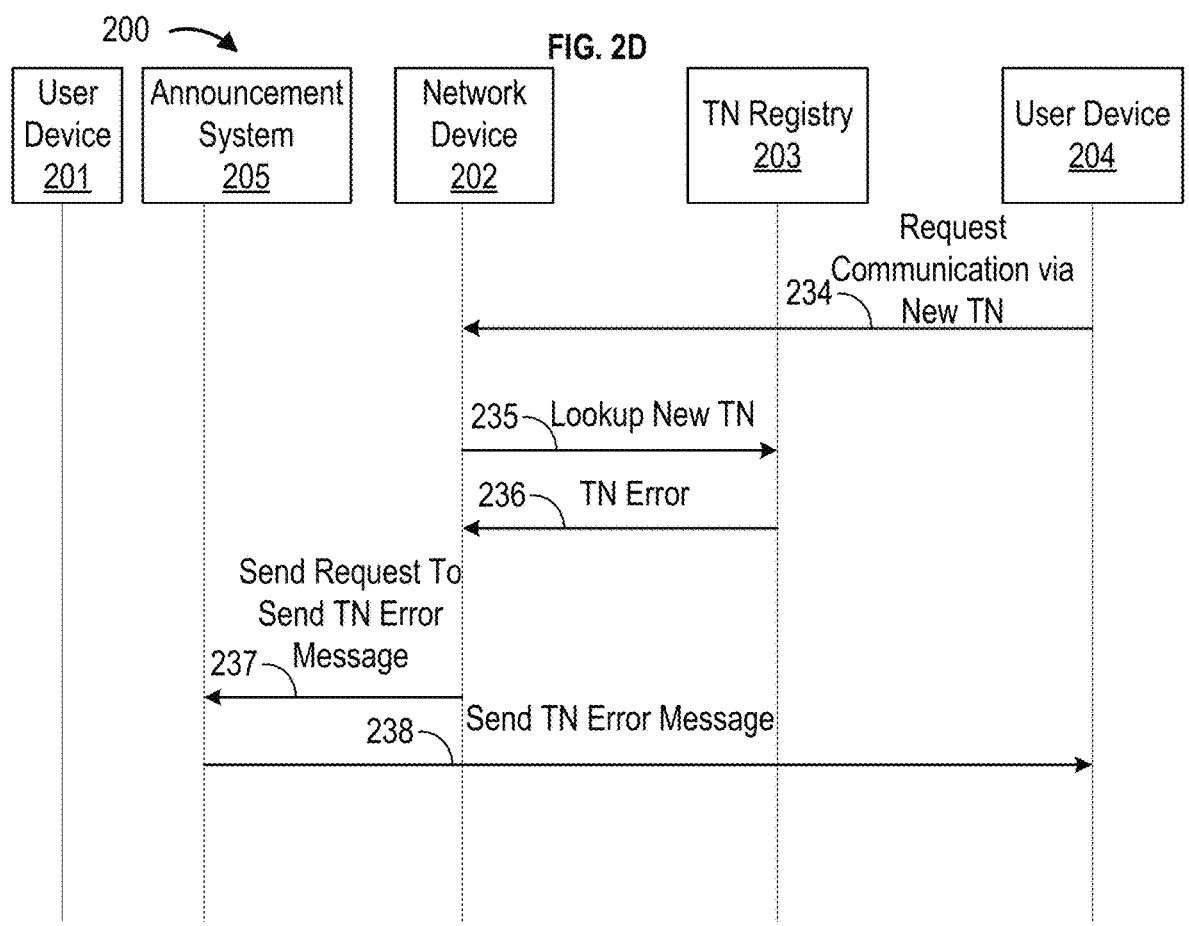

METHODS AND SYSTEMS FOR ALLOCATING TELEPHONE NUMBERS

BACKGROUND

Telephone numbers are assigned to telephony-enabled devices for extended periods by service providers from groups of telephone numbers allocated to the service provider. A telephone number assigned to a telephony-enabled device may be reassigned to another telephony-enabled device, albeit delays in reassignment caused by network/device provisioning requirements and regulatory mandates. Devices that are not configured for telephony service, such as devices without a statically assigned telephone number (e.g., a permanent telephone number, etc.) are unable to communicate via a public switch telephone network (PSTN), such as to make calls to and/or receive calls from an emergency service provider (e.g., police/fire department, emergency medical service, etc.), and/or the like.

SUMMARY

It is to be understood that both the following general description and the following detailed description are exemplary and explanatory only and are not restrictive. Methods and systems for allocating telephone numbers are described.

A user device (e.g., an internet-of-things (IoT) device, a computing device, a network device, a device that is not associated with a static TN, a session initiation protocol (SIP) device, a web real-time communication (webRTC) enabled device, etc.) may be assigned a telephone number (TN). The TN may be assigned to the user device for a time period during which the TN may be used to send and/or receive voice calls. When the time period expires, the TN may be added/returned to a group of telephone numbers available to be assigned to other user devices, or the TN may be added to a group of telephone numbers that are reserved for other user devices.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, together with the description, serve to explain the principles of the methods and systems:

FIGS. 2A-2D show flowcharts for allocating telephone numbers;

DETAILED DESCRIPTION

Figure 1:
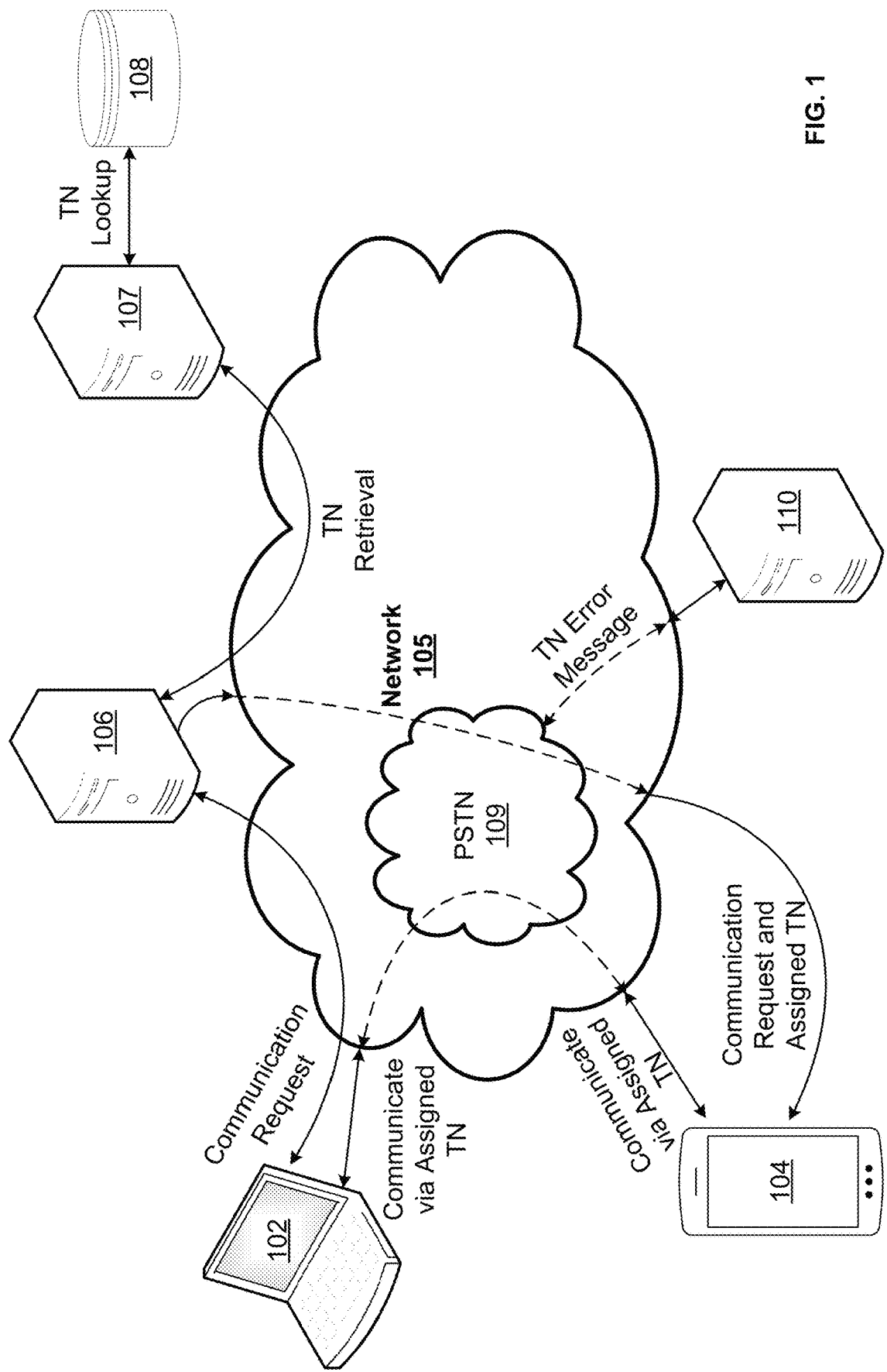
FIG. 1 shows a system for allocating telephone numbers.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application, reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general-purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text, and/or graphics, which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

"Consuming content" or the "consumption of content," as those phrases are used herein, may also be referred to as "accessing" content, "providing" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio.

This detailed description may refer to a given entity performing some action. It should be understood that this language may in some cases mean that a system (e.g., a computer) owned and/or controlled by the given entity is actually performing the action.

A user device (e.g., an internet-of-things (IoT) device, a computing device, a network device, a device that is not associated with a static TN, a session initiation protocol (SIP) device, a web real-time communication (webRTC) enabled device, etc.) may be assigned a telephone number (TN). For example, the user device may send a request to communicate to a network device (e.g., a voice network server, computing device, application server, etc.) that includes identification information associated with the user device that informs the network device that the user device is attempting a voice communication, such as a SIP registration request and/or the like. The network device may authenticate and/or validate the user device and, based on successful authentication/validation, request/determine a telephone number (TN) that the user device may use for one or more communication sessions (e.g., make/receive calls, etc.).

The network device may request/determine the TN by communicating with a telephone number (TN) registry device (e.g., server, computing device, etc.). The network device may include the TN registry device, or the network device and the TN registry device may be separate devices. The TN registry device may access a group of telephone numbers to determine if a TN is assigned (allocated) to and/or reserved for the user device. If no TN is assigned (allocated) to and/or reserved for the user device, a TN may be assigned to the user device. The TN may be assigned to the user device for a time period during which the TN may be used to send and/or receive voice calls. When the time period expires, the TN may be added/returned to a group of telephone numbers available to be assigned to other user devices, or the TN may be added to a group of telephone numbers that are reserved for other user devices.

FIG. 1 shows a system 100 for allocating telephone numbers. A user device 102 may be in communication with a private and/or public network 105 such as the Internet or a local area network. The user device 102 may include an internet-of-things (IoT) device, a computing device, a sensor, a smart meter, a tablet, a network device, a session initiation protocol (SIP) device, a web real-time communication (webRTC) enabled device, and/or any other device that is configured for communication (e.g., voice communication, video communication, signal communication, etc.). The user device 102 may include any device that, while configured for communication, is not actively configured to receive and/or initiate communication via a telephone number (e.g., not configured for telephony service). For example, the user device 102 may not have a static, permanent, and/or semi-permanent telephone number ordinarily, routinely, and/or typically assigned, such as a computing device, a sensor, a smart meter, a control device, and/or the like. The user device 102 may be configured for communication by way of comprising one or more components that support communication service (e.g., a microphone, a speaker, a communications module such as a modem, a transceiver, etc.). Examples of user devices 102 that are not configured for telephony service may include a cellular phone that is not actively assigned a phone number by a telecommunications company, a vehicle telematics system that contains a cellular communications module but is not actively assigned a phone number by a telecommunications company, a smart speaker (e.g., a Google Home, an Amazon Alexa, and the like) that is not actively assigned a phone number by a telecommunications company.

The network 105 may comprise network adapters, switches, routers, modems, and the like connected through wireless links (e.g., radio frequency, satellite) and/or physical links (e.g., fiber optic cable, coaxial cable, Ethernet cable, or a combination thereof). The network 105 may comprise public networks, private networks, wide area networks (e.g., Internet), local area networks, and/or the like. The network 105 may comprise a content access network, content distribution network, and/or the like. The network 105 may be configured to provide communication services to devices throughout the system 100.

The user device 102 (a user of the user device 102) may communicate with a user device 104 (a user of the user device 104). The user device 104 may include a mobile device, a smart device, a communication terminal/device, and/or any other device that is configured for telephone service (e.g., a telephony-enabled device, etc.). To communicate with the user device 104, the user device 102 may send a request to communicate to a network device 106 (e.g., a voice network server, SIP server, computing device, application server, etc.). The communication request may include identification information (e.g., a SIP uniform resource identifier (URI), etc.) associated with the user device 102 that informs the network device 106 that the user device 102 is attempting a voice communication. For example, the communication request may include and/or be associated with a SIP registration request and/or the like. The network device 106 may authenticate and/or validate the user device 106. For example, based on receiving the communication request from the user device 102, the network device 106 may initiate an authentication process (e.g., a challenge question/answer process, a user identification/password verification/validation process, etc.). Successful completion of the authentication process may cause the network device to register the user device 102 and/or enable communications to be addressed to the user device 102 (e.g., via the identification information, etc.).

The network device 106 may request/determine/retrieve a telephone number (TN) from a telephone number (TN) registry device 107 (e.g., server, computing device, etc.) that may be used by the user device 102, for a time period (e.g., temporarily, etc.), to communicate (e.g., make/receive calls, etc.). For example, the user device 102 may use a TN to communicate with the user device 104.

The network device 106 may include and/or be configured with the TN registry device 107, or the network device 106 and the TN registry device 107 may be separate devices. The network device 106 may request/determine the TN by communicating with the telephone number (TN) registry device 107.

The TN registry device 107 may be configured to store, determine, and/or access a state of each TN of a group (a plurality) of telephone numbers, such a TN group 108. The TN registry device 107 may determine if a TN in the TN group 108 is available for assignment/allocation to a user device, currently assigned/allocated to a user device, or reserved for a user device (e.g., the user device 102, etc.). An available TN may be any TN from a group of TNs that are available to be assigned/allocated to a user device or reserved for a user device. An assigned/allocated TN may include any TN that is associated with a user device and being used for a current communication (e.g., voice call, etc.). An assigned/allocated TN may be stored with an indication that an identifier of a user device is associated with the TN. A reserved TN may include any TN that has been previously assigned/allocated. A reserved TN may be stored with an indication that an identifier of a user device is associated with the TN. A reserved TN may be temporarily removed from the group (plurality) of TNs, such as for a duration and/or time period during which the TN may not be assigned/allocated to another user device.

The TN registry device 107 may use any algorithm/method to manage, cycle, and/or organize telephone numbers within a TN group, such as the TN group 108. For example, telephone numbers may be added/removed from a TN group based on a first-in-first-out (FIFO), last-in-first-out (LIFO), round-robin, and/or any other algorithm/method to manage, cycle, and/or organize telephone numbers within a TN group.

The TN registry device 107 may determine if a TN is assigned (allocated) to and/or reserved for the user device 102. If no TN is assigned (allocated) to and/or reserved for the user device 102, a TN may be assigned to the user device 102. The TN may be assigned to the user device 102 for a time period during which the TN may be used to send and/or receive voice calls.

The TN registry device 107, based on the request for communication, may communicate, provide, and/or send the assigned TN to the network device 106. The network device 106 may send the communication request and assigned TN to the user device 104. For example, the network device 106 may route a voice call initiated by the user device 102 to the user 104 using the assigned TN. The network device 106 may send the communication request and assigned TN to the user device 104 via a public switched telephone network (PSTN) 109. The PSTN 109 may include all switched telephone networks around the world that are operated by local, national, or international carriers. The PSTN 109 may be part of and/or in communication with (e.g., via a gateway, etc.) the network 105.

The user device 102 and the user device 104 may communicate (e.g., execute a voice call, etc.) based on the assigned TN. The assigned TN may be used to communicate with the user device 102 for the time period. When the time period expires, the assigned TN may be added/returned to the TN group 108 and made available to be assigned/reassigned to other user devices.

When the user device 104 or any other device attempts to communicate with the user device 102, the time period associated with the assigned TN may have expired. When the time period for a previously assigned TN expires, requests to communicate with the user device 102 based on the previously assigned TN may be routed to message/notification device/system 110. The message/notification device/system 110 may cause the user device 104 or any other device attempting to communicate with the user device 102, based on a previously assigned TN for which the time period has expired, to receive a message/notification (e.g., voice message, etc.) that indicates an error in the attempt to use the previously assigned TN.

FIG. 2A is a communication diagram 200 for allocating telephone numbers. A user of a user device 201 (e.g., an internet-of-things (IoT) device, a computing device, a network device, a session initiation protocol (SIP) device, a web real-time communication (webRTC) enabled device, a device not configured for telephony service, the user device 102, etc.) may need to make a voice call to a user of a device 204 (e.g., a mobile device, a smart device, a communication terminal/device, a telephony-enabled device, the user device 104, etc.).

At 210, the user device 201 may send, for example via an application configured with the user device 201, a request to communicate with the user device 204. For example, a user of the user device 201 may attempt to make a voice call to the user of a user device 204 by dialing a telephone number assigned/allocated to and/or associated with the user device 204. For example, the request to communicate with the user device 204 may include a SIP INVITE message directed from the user device 201 to a telephone number (TN) associated with the user device 204. The request to communicate with the user device 204 may be sent/routed to a network device 202 (e.g., a voice network server, SIP server, computing device, application server, the network device 106, etc.). The request to communicate with the user device 204 may include identification information (e.g., a SIP uniform resource identifier (URI), etc.) associated with the user device 201. The identification information may inform the network device 202 that the user device 201 is attempting a voice communication. The request to communicate with the user device 204 may include and/or be associated with a SIP registration request and/or the like. For example, the identification information may be used to register the user device 201 to a voice network associated with the network device 202. The network device 202 may authenticate and/or validate the user device 201. For example, based on the request to communicate with the user device 204, the network device 202 may initiate an authentication process (e.g., a challenge question/answer process, a user identification/password verification/validation process, etc.). Successful completion of the authentication process may cause the network device 202 to register the user device 201 and/or enable communications to be addressed to the user device 201 (e.g., via the identification information, etc.).

At 211, the network device 202 may request/determine/retrieve a telephone number (TN) from a telephone number (TN) registry 203 (e.g., a server, computing device, etc.) that may be used by the user device 201, for a time period (e.g., temporarily, etc.), to call and/or communicate with the user device 204. The TN registry 203 may be configured to store/determine a state of each TN of a group (a plurality) of telephone numbers. The TN registry 203 may determine if a TN is available for assignment/allocation to a user device, currently assigned/allocated to a user device, or reserved for a user device. An available TN may be any TN from a group of TNs that are available to be assigned/allocated to a user device or reserved for a user device. An assigned/allocated TN may include any TN that is associated with a user device and being used for a current communication (e.g., voice call, etc.). An assigned/allocated TN may be stored with an indication that an identifier of a user device is associated with the TN. A reserved TN may include any TN that has been previously assigned/allocated to a user device and has an active timer. A TN that has been previously assigned/allocated to a user device may be stored with the identifier information of the user device. The timer may indicate a time period during which a TN is configured to remain in a group (plurality) of reserved TNs. A reserved TN may be stored with an indication that an identifier of a user device is associated with the TN. A reserved TN may be temporarily removed from the group (plurality) of reserved TNs, such as for a duration and/or time period during which the TN may not be assigned/allocated to another user device.

The TN registry 203 may assign/allocate a TN to the user device 201, from a group of available (e.g., non-allocated, unreserved, etc.) TNs. The TN registry 203 may determine if a TN is assigned (allocated) to and/or reserved for the user device 201. If no TN is assigned (allocated) to and/or reserved for the user device 201, a TN may be assigned to the user device 201. Assigning the TN to the user device 201 may associate the TN with the identification information of the user device 201. The TN may be assigned to the user device 201 for a time period during which the TN may be used to send and/or receive voice calls. During the time period when the TN may be used to send and/or receive voice calls, the TN may be associated with a group (plurality) of allocated/assigned TNs. At 212, the TN registry 203 may send/provide the allocated TN to the network device 202.

At 213, the network device 202 may send/route the request to communicate with the user device 204 and the assigned TN to the user device 204. For example, the network device 202 may send/route the SIP INVITE message from the user device 201 to a telephone number (TN) associated with the user device 204.

At 214, the user device 201 and the user device 204 may communicate (e.g., execute a voice call, etc.). For example, a user of the user device 204 may answer the call from the user of the user device 201. The user device 201 may communicate, for example via the application and/or an audio interface associated with the user device 201, with the user device 204. The application may cause one or more interactive elements (e.g., icons, etc.) to be displayed via the user device 201 that, when interacted with, enable the user device 201 to initiate (send) and/or terminate (e.g., end, hang up, etc.) a communication session, such as the communication session with the user device 204. The user device 201 may include one or more interactive elements (e.g., buttons, switches, etc.) that, when interacted with, enable the user device 201 to initiate (send) and/or terminate (e.g., end, hang up, etc.) a communication session, such as the communication session with the user device 204. In a scenario where the user device 201 is an IoT device, the application may activate and/or utilize one or more audio interfaces associated with the user device 201 (e.g., a native microphone, a native speaker, etc.) and communicate with the network device 202 and/or the user device 204, for example, without a display of one or more interactive elements (e.g., icons, etc.). The application may be configured to automatically initiate and/or terminate one or more communication sessions associated with the user device 201.

At 215, the communication between the user device 201 and the user device 204 may be terminated. For example, the user device 201 and/or the user device 204 may terminate (e.g., hang up, etc.) the communication session.

At 216, the network device 202 may release, send, and/or return the assigned TN to the TN registry 203. The assigned TN may be used to communicate with the user device 201 for the time period. For example, when the communication between the user device 201 and the user device 204 is terminated, a timer may be initiated that corresponds to the time period. During the time period (e.g., while the time is active/running, etc.) the assigned TN may be associated with a group (plurality) of reserved TNs. During the time period, the user device 204 and/or any other device may communicate with (e.g., call, etc.) the user device 201 according to the TN reserved for the user device 201, such as by dialing the reserved TN.

At 217, the user device 204 may send a request to communicate with the user device 201 according to the TN previously assigned to the user device 201. For example, the user of the user device 204 may use/dial the previously assigned TN to callback the user of the user device 201. The request to communicate with the user device 201 may be routed to the network device 202.

At 218, the network device 202 may send/provide the previously assigned TN being used by the user device 204 to the TN registry 203. For example, the network device 202 may determine that the previously assigned TN is not registered (e.g., being actively used by, etc.) to the user device 201 and send/provide the previously assigned TN to the TN registry 203 to determine a current state of the previously assigned TN. During the time period, the previously assigned TN may be determine to be associated with the group (plurality) of reserved TNs. The TN registry 203 may store an indication that the identifier information of the user device 201 is associated with the previously assigned TN.

At 219, the TN registry 203, based on the previously assigned TN being associated with the group (plurality) of reserved TNs, may send/provide the identifier information of the user device 201 associated with reserved TN to the network device 202. The TN may be removed/disassociated from the group (plurality) of reserved TNs and be associated with a group (plurality) of assigned/allocated (active) TNs. The TN registry 203 may store an indication that the identifier information of the user device 201 is associated with the group (plurality) of assigned/allocated (active) TNs.

At 220, the network device 202 may use the identifier information associated with the user device 201, such as the identifier, to determine/identify the user device 201. The network device 202 may send/route the request to communicate with the user device 201 via the assigned TN to the user device 201.

At 221, the user device 201 and the user device 204 may communicate (e.g., execute a voice call, etc.). For example, the user of the user device 201 may answer the return call from the user of the user device 204. When the communication between the user device 201 and the user device 204 ends (e.g., the user device 201 and/or the user device 204 hangs up, etc.) the assigned TN may be associated with the group (plurality) of reserved TNs until the time period expires, at which point the previously reserved TN may be associated with a group (plurality) of available/free TNs and made available to be assigned/reassigned to other user devices.

FIG. 2B continues the communication diagram 200 for allocating telephone numbers. FIG. 2B depicts a scenario where the user of the user device 204 may attempt to call the user of the user device 201 at the previously assigned TN before the time period has expired. At 222, the network device 202 may receive a request from the user device 204 (or any other device) based on the previously assigned TN.

At 223, the network device 202 may access and/or communicate with the telephone number (TN) registry 203 to determine a state of the previously assigned TN. For example, the network device 202 may determine that the previously assigned TN is not registered (e.g., being actively used by, etc.) to the user device 201 and send/provide the previously assigned TN to the TN registry 203 to determine a current state of the previously assigned TN. During the time period, the previously assigned TN may be determined to be associated with the group (plurality) of reserved TNs.

At 224, the TN registry 203, based on the previously assigned TN being associated with the group (plurality) of reserved TNs, may send/provide the identifier information of the user device 201 associated with reserved TN to the network device 202. The TN may be removed/disassociated from the group (plurality) of reserved TNs and be associated with a group (plurality) of assigned/allocated (active) TNs.

At 225, the network device 202 may use the identifier information associated with the user device 201 to determine/identify the user device 201. The network device 202 may send/route the request to communicate with the user device 201 via the assigned TN to the user device 201.

At 226, the user device 201 and the user device 204 may communicate (e.g., execute a voice call, etc.). For example, the user of the user device 201 may answer the return call from the user of the user device 204. When the communication between the user device 201 and the user device 204 ends, the assigned TN may be associated with the group (plurality) of reserved TNs until the time period expires, at which point the previously reserved TN may be associated with a group (plurality) of available/free TNs and made available to be assigned/reassigned to other user devices.

FIG. 2C continues the communication diagram 200 for allocating telephone numbers. FIG. 2C depicts a scenario where the user of the user device 201 may attempt to call the user of the user device 204 at the TN assigned to and/or associated with the user device 204 via the TN previously assigned to the user device 201 after the time period has expired.

At 227, the user device 201 may send, for example via the application configured with the user device 201, a request to communicate with the user device 204. The user of the user device 201 may attempt to make a voice call to the user of a user device 204 by dialing the TN previously assigned to and/or associated with the user device 204. For example, the request to communicate with the user device 204 may include a SIP INVITE message directed from the user device 201 to the TN associated with the user device 204. The request to communicate with the user device 204 may be sent/routed to a network device 202 (e.g., a voice network server, SIP server, computing device, application server, the network device 106, etc.). The request to communicate with the user device 204 may include the identification information (e.g., a SIP uniform resource identifier (URI), etc.) associated with the user device 201. The identification information may inform the network device 202 (voice network) that the user device 202 is attempting a voice communication. The request to communicate with the user device 204 may include and/or be associated with a SIP registration request and/or the like. For example, the identification information may be used to register the user device 202 to the voice network associated with the network device 202. The network device 202 may authenticate and/or validate the user device 201. For example, based on the request to communicate with the user device 204, the network device 202 may initiate an authentication process (e.g., a challenge question/answer process, a user identification/password verification/validation process, etc.). Successful completion of the authentication process may cause the network device 202 to register the user device 201 and/or enable communications to be addressed to the user device 201 (e.g., via the identification information, etc.).

At 228, the network device 202 may request/determine/retrieve the TN previously assigned to the user device 201 from the TN registry 203. It may be determined that the time period associated with the TN previously assigned to the user device 201 is expired and/or that the TN previously assigned to the user device 201 is no longer assigned to the user device 201. To complete the request to communicate with the user device 204, the user device 201 may be assigned, for a time period (e.g., temporarily, etc.), a new TN to call and/or communicate with the user device 204. The TN registry 203 may assign/allocate a new TN to the user device 201, from a group of free (e.g., available, unassigned, unreserved, etc.) TNs. Assigning the new TN to the user device 201 may associate the new TN with the identification information of the user device 201. The new TN may be assigned to the user device 201 for a time period during which the new TN may be used to send and/or receive voice calls. At 229, the TN registry 203 may send/provide the assigned TN to the network device 202.

At 230, the network device 202 may send/route the request to communicate with the user device 204 and the new TN to the user device 204. For example, the network device 202 may send/route the new TN and the SIP INVITE message from the user device 201 to the TN associated with the user device 204.

At 231, the user device 201 and the user device 204 may communicate (e.g., execute a voice call, etc.) via the new TN. For example, a user of the user device 204 may answer the call from the user of the user device 201.

At 232, the communication between the user device 201 and the user device 204 may be terminated. For example, the user device 201 and/or the user device 204 may terminate (e.g., hang up, etc.) the communication session.

At 233, the network device 202 may release, send, and/or return the new TN to the TN registry 203. The new TN may be used to communicate with the user device 201 for a time period. For example, when the communication between the user device 201 and the user device 204 is terminated, a timer may be initiated that corresponds to a time period associated with the new TN. During the time period (e.g., while the time is active/running, etc.) the new TN may be associated with the group (plurality) of reserved TNs. During the time period, the user device 204 and/or any other device may communicate with (e.g., call, etc.) the user device 201 according to the new TN reserved for the user device 201, such as by dialing the new TN.

FIG. 2D continues the communication diagram 200 for allocating telephone numbers. FIG. 2D depicts a scenario where the user of the user device 204 may attempt to call the user of the user device 201 at the new TN after the time period has expired. At 234, the network device 202 may receive a request from the user device 204 (or any other device) based on the previously assigned TN.

At 235, the network device 202 may access and/or communicate with the telephone number (TN) registry 203 to determine a state of the new TN. At 236, it may be determined that the time period associated with the new TN is expired. TN registry 203, based on the expired time period, may send/provide a notification, such as a TN error message, to the network device 202. The notification may indicate that the new TN is no longer associated with the identification information associated with the user device 201.

At 237, the network device 202 may send a request to an announcement system 205 to send the TN error message and/or a notification associated with the TN error message to the user device 204. The announcement system 205 may be a device/system/component configured to send, store, and record messages. At 238, the announcement system 205 may send the TN error message and/or a notification associated with the TN error message to the user device 204. For example, the user of the user device 204 may hear an audible recording of the TN error message and/or a notification associated with the TN error message.

Figure 3:
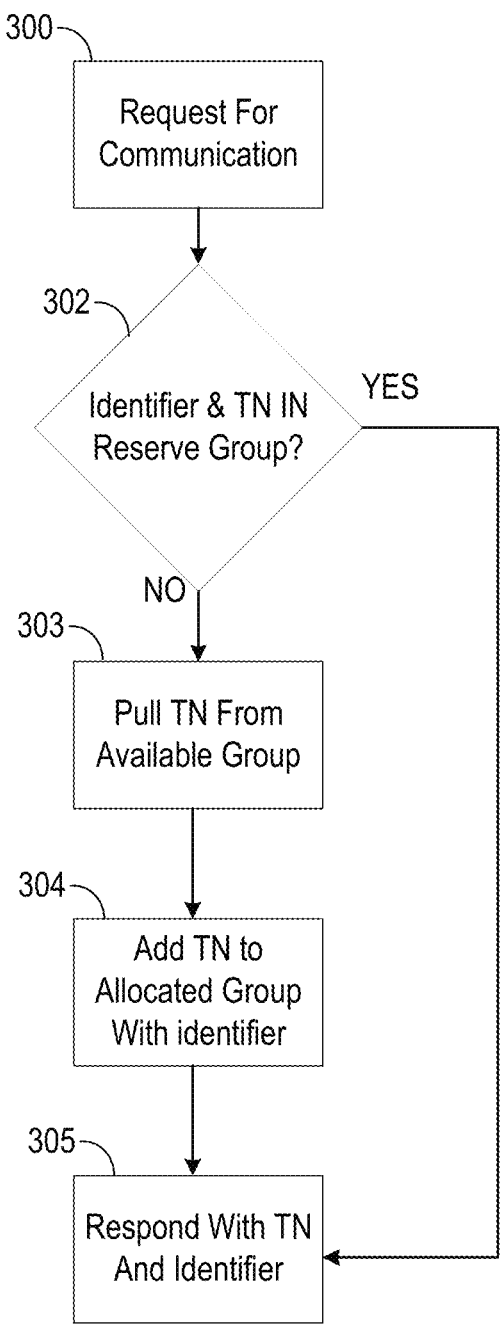
FIG. 3 shows a flowchart for allocating telephone numbers.

FIG. 3 shows a flowchart for allocating telephone numbers. At 300, a user device (e.g., an internet-of-things (TOT) device, a computing device, a network device, a session initiation protocol (SIP) device, a web real-time communication (webRTC) enabled device, a device not configured for telephony service, the user device 102, etc.) may request the communication session, such as a voice call with another device (a telephony-enabled device, a user device, etc.). The request for the communication session may be sent to a voice network (e.g., a device/component of a voice network, the network device 202, etc.), and may include an identifier (e.g., identifier information, SIP URI, etc.) of the user device. The voice network may send the identifier to a TN registry (e.g., a server, computing device, database, etc.).

At 302, the TN registry may use the identifier to search a database, record, profile, and or the like to whether the identifier is associated with a TN. The TN registry may store state information for a plurality of TNs. The TN registry may maintain groups of TNs based on the state of the TNs. A TN may be associated with a group of available TNs that are available for assignment/allocation to (association with) a device, a group of allocated TNs that are currently assigned/allocated to a device, or a group of reserved TNs that are each reserved for a device. For example, an available TN may be any TN from a group of TNs that are available to be assigned/allocated to a user device or reserved for a user device. A TN may be determined to be available from a group of available TNs by determining that the TN is a next TN in a cycle of TNs within the group of available TNs. The cycle of TNs within the group of available TNs may include at least one of: a first-in-first-out (FIFO) cycle of TNs within the group of available TNs, a last-in-first-out (LIFO) cycle of TNs within the group of available TNs, or a round-robin cycle of TNs within the group of available TNs. Any cycle of TNs within the group of available TNs may be used.

An assigned/allocated telephone number may include any TN that is associated with a device (e.g., associated with and/or mapped to an identifier of a device, etc.) and is used for a current communication (e.g., voice call, etc.). An assigned/allocated TN may be stored with an indication that an identifier of a user device is associated with the TN. A reserved TN may include any TN that has been previously assigned/allocated to a device, as indicated by an association with an identifier of a device, and associated with an active timer. A reserved TN may be stored with an indication that an identifier of a user device is associated with the TN. A TN may remain a reserved TN for a set duration, such as during the duration of an active timer. A reserved TN may be temporarily removed from a group (plurality) of available telephone numbers, such as for a duration and/or time period during which the telephone number may not be assigned/allocated to another device.

At 302, the TN registry may determine whether the identifier is associated with a TN associated with the group of reserved TNs. For example, the TN registry may determine if a stored record of association between the identifier and a TN exists and if a timer associated with the TN is active. If the identifier is associated with a TN associated with the group of reserved TNs, then the method may proceed to step 305. At 305, the TN registry may send the identifier and TN to the voice network. The user device may use the TN to communicate via the voice network.

If the identifier is not associated with a TN associated with the group of reserved TNs, at step 303, the TN registry may pull/determine a TN from the group of available TNs. At 304, the TN pulled/determined from the group of available TNs may be added to the group of allocated TNs and associated with the identifier. At 305, the TN registry may send the identifier and the TN allocated to the user device to the voice network. The user device may use the TN to communicate via the voice network.

Figure 4:
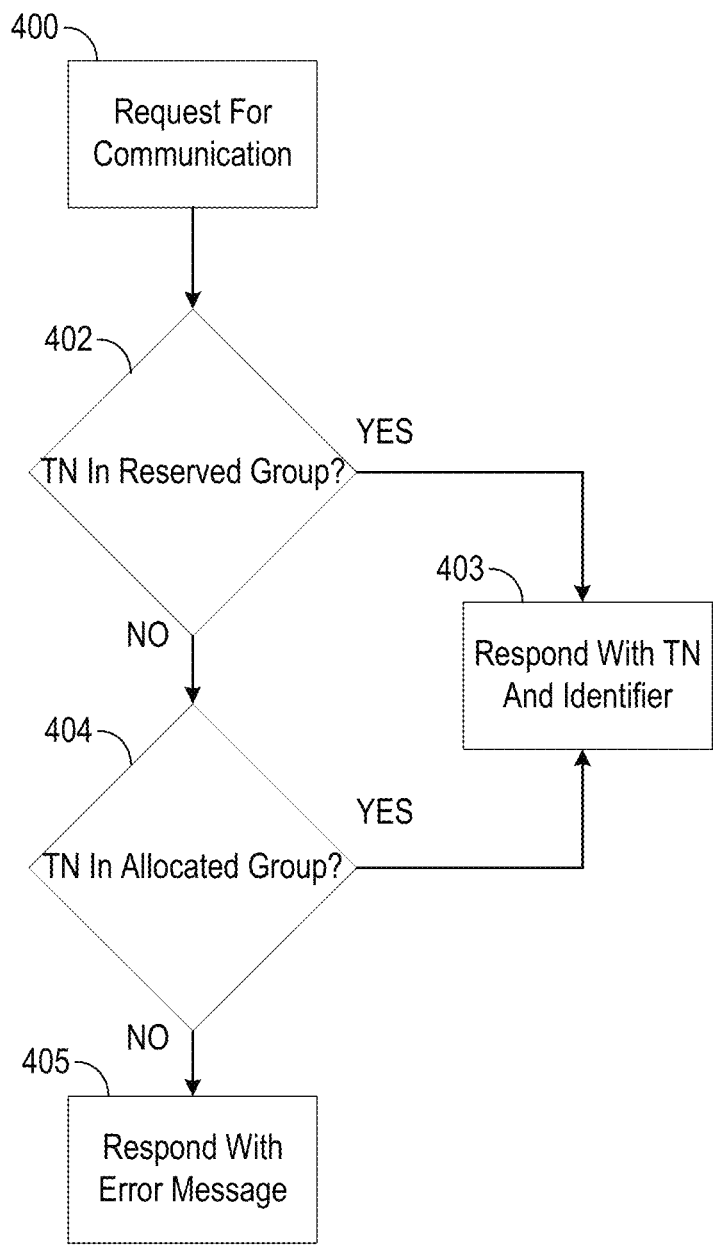
FIG. 4 shows a flowchart for allocating telephone numbers.

FIG. 4 shows a flowchart for allocating telephone numbers. At 400, a device (a telephony-enabled device, a user device, etc.) may request a communication session, such as a voice call with a user device (e.g., an internet-of-things (JOT) device, a computing device, a network device, a session initiation protocol (SIP) device, a web real-time communication (webRTC) enabled device, a device not configured for telephony service, the user device 102, etc.). The request for the communication session may be a request to communicate with the user device via a telephone number (TN). The request may be sent to a voice network (e.g., a device/component of a voice network, the network device 202, etc.). The voice network may send the TN to a TN registry (e.g., a server, computing device, database, etc.).

The TN registry may store state information for a plurality of TNs. The TN registry may maintain groups of TNs based on the state of the TNs. A TN may be associated with a group of available TNs that are available for assignment/allocation to (association with) a device, a group of allocated TNs that are currently assigned/allocated to device, or a group of reserved TNs that are each reserved for a device. For example, an available TN may be any TN from a group of TNs that are available to be assigned/allocated to a user device or reserved for a user device. An assigned/allocated TN may include any TN that is associated with a user device and being used for a current communication (e.g., voice call, etc.). An assigned/allocated TN may be stored with an indication that an identifier of a user device is associated with the TN. A reserved TN may include any TN that has been previously assigned/allocated. A reserved TN may be stored with an indication that an identifier of a user device is associated with the TN. A reserved TN may be temporarily removed from the group (plurality) of TNs, such as for a duration and/or time period during which the TN may not be assigned/allocated to another user device.

At 402, the TN registry may determine whether the identifier is associated with a TN associated with the group of reserved TNs. For example, the TN registry may determine if a stored record of association between the identifier and a TN exists. If a stored record of association between the identifier and a TN exists, then a timer associated with the TN is active. If the identifier is associated with a TN associated with the group of reserved TNs, then the method may proceed to step 403. At 403, the TN registry may respond to the voice network with the identifier and TN. The voice network may use the identifier to identify the user device and the device may use the TN to communicate, via the voice network, to the user device.

If the identifier is not associated with a TN associated with the group of reserved TNs, at step 404, the TN registry the TN is associated with the group of allocated TNs. If the TN is associated with the group of allocated TNs then the TN has been assigned to (associated with) a different user device. If the TN has been assigned to a different user device, the device will be unable to communicate with the user device using the TN. At 405, if the TN has been assigned to a different user device, the TN registry may respond to the voice network with an error message that indicates that the TN is not allocated/assigned to the user device and/or the user device may not be communicated with using the TN.

Figure 5:
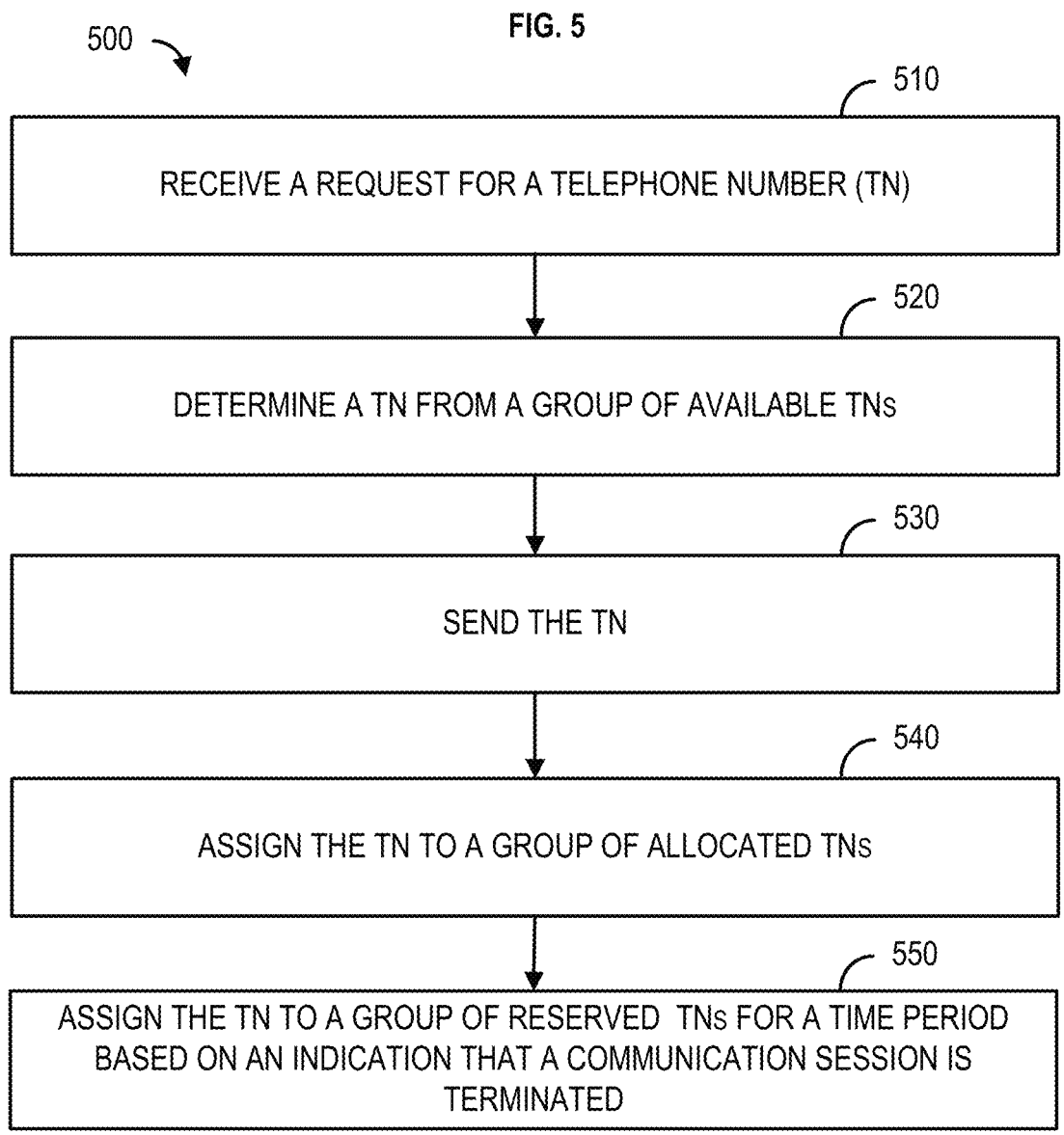
FIG. 5 shows a flowchart of a method for allocating telephone numbers.

FIG. 5 shows a flowchart of a method 500 for allocating telephone numbers. At 510, a request for a telephone number (TN) may be received. A telephone number (TN) registry (e.g., a server, computing device, database, the TN registry 203, etc.) may receive a request for a TN. The TN registry may receive the request for the TN from a voice network (e.g., a device/component of a voice network, the network device 202, etc.). The request for the TN may be sent to the TN registry based on a first device (e.g., an internet-of-things (JOT) device, a computing device, a network device, a session initiation protocol (SIP) device, a web real-time communication (webRTC) enabled device, a device not configured for telephony service, the user device 102, the user device 201, etc.) attempting a communication session (e.g., a voice communication session, etc.) with a second device (e.g., a telephony-enabled device, the user device 104, the user device 204, etc.). For example, the first device may be a device that is not associated with a static TN and/or a device where telephony service is disabled/inoperative, such as a laptop computer, and a user may need to make a call to an emergency service (e.g., police/fire department, etc.). The first device may be configured with an application that enables voice calls and/or telephone numbers to be dialed during a call, and the call may be routed to and/or facilitated by the network device.

The first device may send a request for a communication session to the voice network that includes an identifier associated with the first device, such as a session initiation protocol (SIP) uniform resource identifier (URI) and/or any other identification information. The identifier may indicate to the voice network that the first device is attempting to establish a communication session (e.g., a phone call, etc.). The voice network may use the identifier to register the first device with the voice network. Registering the first device with the voice network may be based on an authentication process that authenticates and/or validates the user device. The voice network may send the request for the TN to the TN registry to enable the user device to establish the communication session with the second device. The request for the TN may include the identifier of the first device.

At 520, a TN may be determined from a group of TNs. The TN registry may determine a TN from a group of available TNs. The TN registry may store state information for a plurality of TNs. The TN registry may maintain groups of TNs based on the state of the TNs. A TN may be associated with a group of available TNs that are available for assignment/allocation to (association with) a device, a group of allocated TNs that are currently assigned/allocated to a device, or a group of reserved TNs that are each reserved for a device. For example, an available TN may be any TN from a group of TNs that are available to be assigned/allocated to a user device or reserved for a user device. A TN may be determined to be available from a group of available TNs by determining that the TN is a next TN in a cycle of TNs within the group of available TNs. The cycle of TNs within the group of available TNs may include at least one of: a first-in-first-out (FIFO) cycle of TNs within the group of available TNs, a last-in-first-out (LIFO) cycle of TNs within the group of available TNs, or a round-robin cycle of TNs within the group of available TNs. Any cycle of TNs within the group of available TNs may be used.

An assigned/allocated TN may include any TN that is associated with a user device and being used for a current communication (e.g., voice call, etc.). An assigned/allocated TN may be stored with an indication that an identifier of a user device is associated with the TN. A reserved TN may include any TN that has been previously assigned/allocated. A reserved TN may be stored with an indication that an identifier of a user device is associated with the TN. A reserved TN may be temporarily removed from the group (plurality) of TNs, such as for a duration and/or time period during which the TN may not be assigned/allocated to another user device.

At 530, the TN may be sent. The TN registry may send the TN to the voice network to enable the first device to use the TN for the communication session with the second device. The TN may allocate/assign the TN to the first device from a group of reserved TNs. For example, The TN registry may determine that the identifier of the first device is associated with (e.g., stored with, in a profile with, etc.) the TN, and that a timer associated with the TN is active. TN registry may send the TN to the voice network based on the identifier of the first device being associated with (e.g., stored with, in a profile with, etc.) the TN the timer being active. The duration of the time is a configurable parameter and may be set to any value. For example, a service provider may set the duration for the timer to any value. The TN may allocate/assign the TN to the first device from a group of available TNs. For example, The TN registry may determine that the identifier of the first device is associated with (e.g., stored with, in a profile with, etc.) a TN in the group of reserved TNs and/or a group of allocated TNs.

At 540, the TN may be assigned to (associated with) the group of allocated TNs. The TN registry may assign the TN to the group of allocated TNs based on sending the TN to the first device to use for the communication session. Assigning the TN to the group of allocated TNs may include storing an indication that the identifier is associated with TN.

At 550, the TN may be assigned to (associated with) the group of reserved TNs. For example, an indication that the communication session is terminated may be received. The TN registry may receive the indication from the voice network. The indication that the communication session is terminated may be based on the first device, the second device, and/or the like terminating the communication session, such as by hanging up, and/or any interruption in service. The TN registry may assign the TN to the group of reserved TNs based on the indication that the communication session is terminated. Assigning the TN to the group of reserved TN may include storing an indication that the identifier is associated with TN and an indication that the time period and/or a timer associated with the time period is active. The time period may include a time period during which the TN may be used for one or more communication sessions associated with the identifier, such as communications initiated by the first device, the second device, and/or a third device. For example, the TN registry may another request for the TN from the voice network that includes the identifier of the first device. The TN registry may use the identifier and/or the TN to determine that the timer is active. The TN registry, based on the active timer, may determine that the TN is assigned to the group of reserved telephone numbers. The TN registry may again send the TN to the voice network to enable the first device to use the TN for the other communication session. While the TN is in use by the first device, the TN registry may again assign the TN to the group of allocated telephone numbers.

Figure 6:
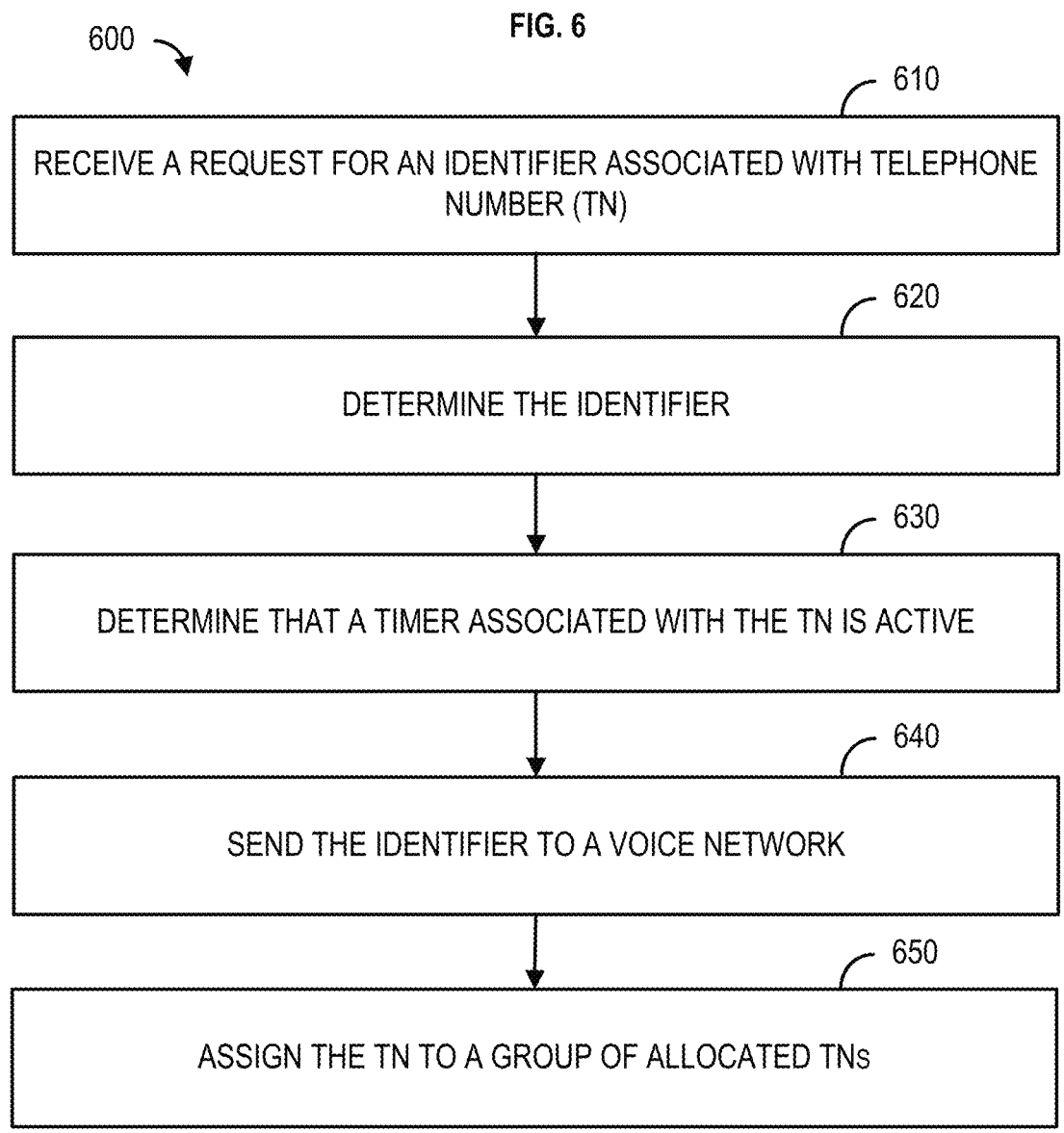
FIG. 6 shows a flowchart of a method for allocating telephone numbers.

FIG. 6 shows a flowchart of a method 600 for allocating telephone numbers. At 610, a request for an identifier may be received. A telephone number (TN) registry (e.g., a server, computing device, database, the TN registry 203, etc.) may receive a request for an identifier of a first device (e.g., an internet-of-things (IoT) device, a computing device, a network device, a session initiation protocol (SIP) device, a web real-time communication (webRTC) enabled device, a device not configured for telephony service, the user device 102, the user device 201, etc.). The identifier associated with the first device may be, for example, a session initiation protocol (SIP) uniform resource identifier (URI) and/or any other identification information. The TN registry may receive the request for the identifier from a voice network (e.g., a device/component of a voice network, the network device 202, etc.). The voice network may send the request for the identifier to the TN registry based on a second device (e.g., a telephony-enabled device, the user device 104, the user device 204, etc.) attempting to establish a communication session with the first device using a TN associated with the first device based on a previous communication session with the first device. For example, the TN may be a TN previously used by the first device to establish a voice communication session (e.g., a call, etc.) with the second device and/or vice versa. The voice network may send the request for the identifier to the TN registry to determine/identify the first device that the second device is attempting to establish a communication session with.

At 620, the identifier may be determined. The TN registry may use the TN associated with the first device based on a previous communication session to determine the identifier. The TN registry may store information for a plurality of TNs. The TN registry may maintain groups of TNs based on a state of the TNs. For example, a TN may be associated with a group of available TNs that are available for assignment/allocation to (association with) a device, a group of allocated TNs that are currently assigned/allocated to device, or a group of reserved TNs that are each reserved for a device. An assigned/allocated telephone number may include any TN that is associated with a device (e.g., associated with and/or mapped to an identifier of a device, etc.) and being used for a current communication (e.g., voice call, etc.). A reserved TN may include any TN that has been previously assigned/allocated to a device, as indicated by an association with an identifier of a device, and associated with an active timer. For example, a TN may remain a reserved TN for a set duration, such as during the duration of an active timer. To determine the identifier, the TN registry may determine that a stored record of association exists between the TN received from the voice network and the identifier in the group of reserved TNs.

At 630, a timer associated with the TN may be determined to be active. The TN registry may determine that the timer is active because the TN and identifier are associated with the group of reserved TNs.

At 640, the identifier may be sent to the voice network. The TN registry may send the identifier to the voice network based on determining that the time is active for the TN associated with the group of reserved TNs. The voice network may use the identifier to determine/identify the first device. The voice network may send/route a request to for a communication session from the second device to the first device based on the TN and the identifier.

At 650, the TN may be assigned to (associated with) the group of allocated TNs. The TN registry may assign the TN to the group of allocated TNs while the TN is being used for the communication session. The TN registry may again assign the TN to the group of reserved TNs if an indication that the communication session is terminated is received while the timer is active. The TN registry may again assign the TN to the group of available TNs if an indication that the communication session is terminated is received and the timer is expired.

Figure 7:
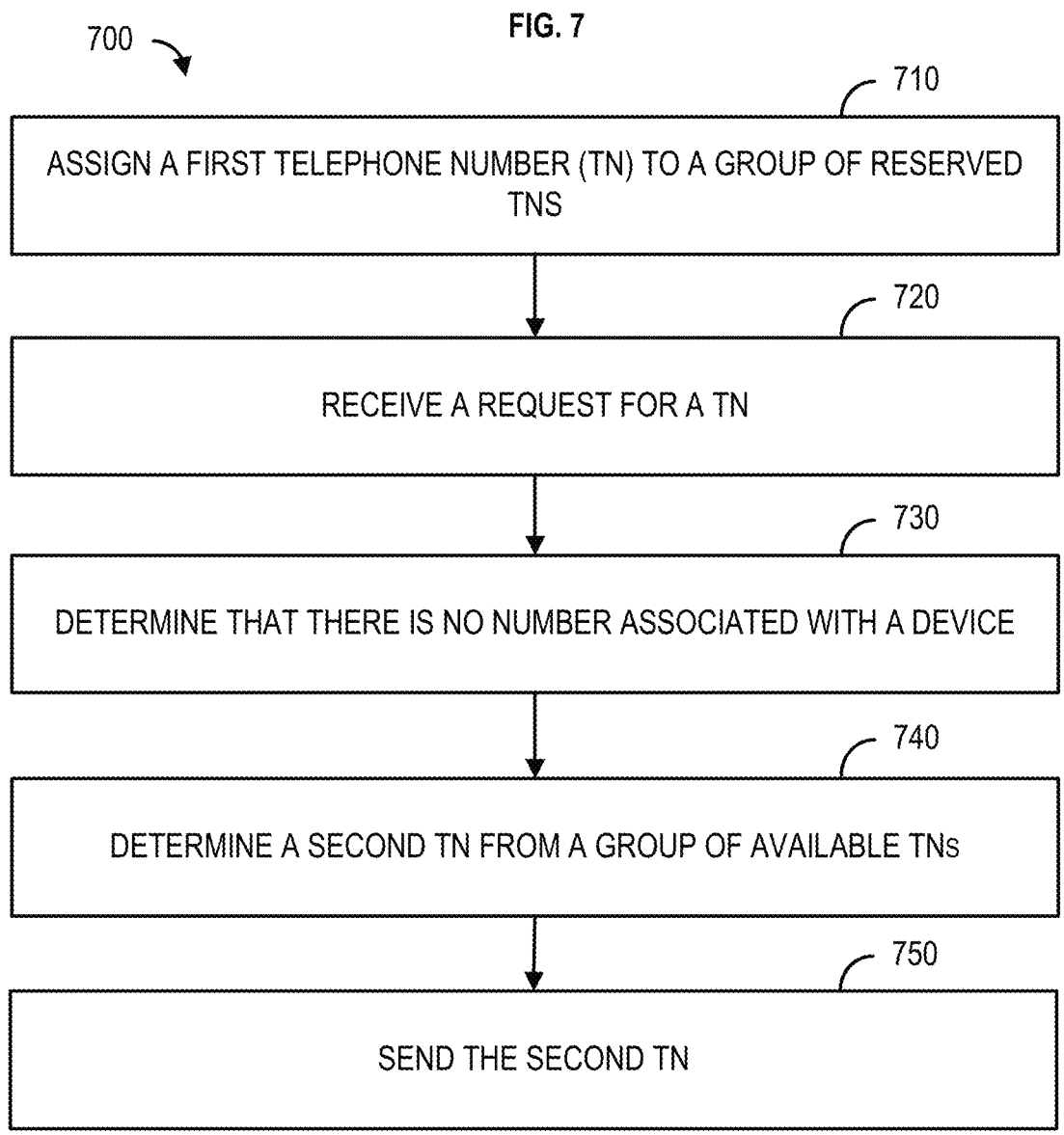
FIG. 7 shows a flowchart of a method for allocating telephone numbers.

FIG. 7 shows a flowchart of a method 700 for allocating telephone numbers (TNs). At 710, a first telephone number associated with an identifier of a first device (e.g., an internet-of-things (IoT) device, a computing device, a network device, a session initiation protocol (SIP) device, a web real-time communication (webRTC) enabled device, a device not configured for telephony service, the user device 102, the user device 201, etc.) may be reassigned from a group of reserved telephone numbers to a group of available telephone numbers. A telephone number (TN) registry (e.g., a server, computing device, database, the TN registry 203, etc.) may assign the TN from the group of reserved telephone numbers to the group of available telephone numbers. For example, the TN registry may store information for a plurality of TNs. The TN registry may maintain groups of TNs based on a state of the TNs. For example, the group of available TNs may include TNs that are available for assignment/allocation to (association with) a device, a group of allocated TNs may include TNs that are currently assigned/allocated to device, and the group of reserved TNs may include TNs that are each reserved for a device. An assigned/allocated telephone number may include any TN that is associated with a device (e.g., associated with and/or mapped to an identifier of a device, etc.) and being used for a current communication session (e.g., voice call, etc.). A reserved TN may include any TN that has been previously assigned/allocated to a device, as indicated by an association with an identifier of a device, and associated with an active timer. For example, a TN may remain a reserved TN for a configurable duration, such as during the duration of an active timer. The TN registry may assign the first TN from the group of reserved telephone numbers to the group of available telephone numbers based on a timer associated with the first TN expiring.

At 720, a request for a TN may be received. The TN registry may receive the request for the TN from a voice network (e.g., a device/component of a voice network, the network device 202, etc.) based on a request for a communication session (e.g., a voice communication session, a call, etc.). The request for the TN may be based on the first device requesting a communication session with a second device (e.g., a mobile device, a smart device, a communication terminal/device, a telephony-enabled device, the user device 104, the user device 204, etc.). The TN may enable the first device to establish the communication session with the second device. The request for the TN may include an identifier and/or identification information associated with the first device, such as a session initiation protocol (SIP) uniform resource identifier (URI) and/or any other identifier or identification information.

At 730, it may be determined that there is no TN associated with the first device in the group of reserved telephone numbers. The TN registry may use the identifier received with the request for the TN to access stored information and determine that there is no TN associated with the first device in the group of reserved telephone numbers.

At 740, a second TN may be determined. The TN registry may determine the second TN from the group of available telephone numbers. The second TN may be a TN that is not associated with any identifier and/or allocated to a device.

At 750, the second TN may be sent. The TN registry may send the send TN to the voice network. The voice network may enable the first device to use the second TN for communication sessions. The second TN the TN may be assigned to (associated with) the group of allocated TNs. The TN registry may assign the second TN to the group of allocated TNs while the second TN is being used for by the first device for communication sessions. The TN registry may again assign the second TN to the group of reserved TNs if an indication that a communication session is terminated is received while a timer associated with the second TN is active. The TN registry may again assign the second TN to the group of available TNs if an indication that the communication session is terminated is received and the timer is associated with the second TN s expired.

Figure 8:
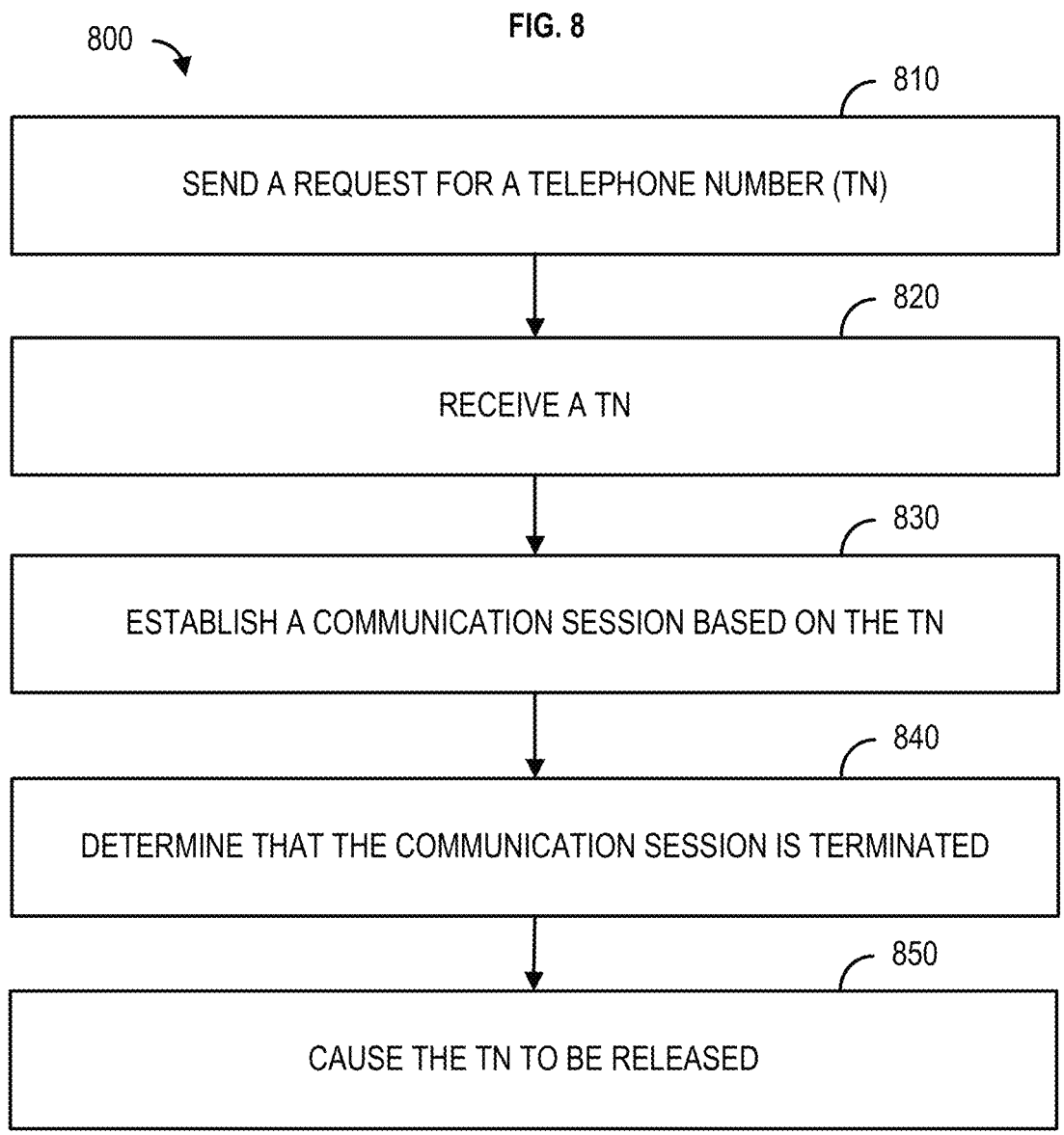
FIG. 8 shows a flowchart of a method for allocating telephone numbers.

FIG. 8 shows a flowchart of a method 800 for allocating telephone numbers (TNs). At 810, a request for a telephone number (TN) may be sent. A voice network (e.g., a device/component of a voice network, the network device 202, etc.) may send the request for the TN to a telephone number (TN) registry (e.g., a server, computing device, database, the TN registry 203, etc.). The request for the TN may be sent to the TN registry based on a first device (e.g., an internet-of-things (TOT) device, a computing device, a network device, a session initiation protocol (SIP) device, a web real-time communication (webRTC) enabled device, a device not configured for telephony service, the user device 102, the user device 201, etc.) attempting a communication session (e.g., a voice communication session, etc.) with a second device (e.g., a telephony-enabled device, the user device 104, the user device 204, etc.). For example, the first device may be a device that is not associated with a static TN and/or a device where telephony service is disabled/inoperative, such as a laptop computer, and a user may need to make a call to an emergency service (e.g., police/fire department, etc.). The first device may be configured with an application that enables voice calls and/or telephone numbers to be dialed during a call, and the call may be routed to and/or facilitated by the network device. The first device may send a request for a communication session to the voice network that includes an identifier associated with the first device, such as a session initiation protocol (SIP) uniform resource identifier (URI) and/or any other identification information. The identifier may indicate to the voice network that the first device is attempting to establish a communication session (e.g., a phone call, etc.). The voice network may use the identifier to register the first device with the voice network. Registering the first device with the voice network may be based on an authentication process that authenticates and/or validates the user device. The voice network may send the request for the TN to the TN registry to enable the user device to establish the communication session with the second device. The request for the TN may include the identifier of the first device.

At 820, a TN may be received. The voice network may receive the TN from the TN registry. The TN may be associated with the identifier of the first device. For example, the TN registry may store information for a plurality of TNs. The TN registry may maintain groups of TNs based on a state of the TNs. For example, the group of available TNs may include TNs that are available for assignment/allocation to (association with) a device, a group of allocated TNs may include TNs that are currently assigned/allocated to device, and the group of reserved TNs may include TNs that are each reserved for a device. An assigned/allocated telephone number may include any TN that is associated with a device (e.g., associated with and/or mapped to an identifier of a device, etc.) and being used for a current communication session (e.g., voice call, etc.). A reserved TN may include any TN that has been previously assigned/allocated to a device, as indicated by an association with an identifier of a device, and associated with an active timer. For example, a TN may remain a reserved TN for a configurable duration, such as during the duration of an active timer. The TN registry may use the identifier of the first device to determine that the identifier is associated with a TN associated with the group of reserved TNs. The TN registry may send the voice network the TN from the group of reserved TNs.

At 830, a communication session between the first device and the second device may be established. The communication session may be established based on the TN received by the voice network. The first device may use the TN to call the second device and establish the communication session between the first device and the second device.

At 840, the communication session may be terminated. The voice network may determine that the communication session is terminated based on an indication that the communication session is terminated. The indication that the communication session is terminated may be based on the first device, the second device, and/or the like terminating the communication session, such as by hanging up, and/or any interruption in service.

At 850, an indication configured to cause the TN registry to release the TN may be sent. The voice network may send the indication to the TN registry based on the indication that the communication session is terminated. The TN registry, based on the indication received from the voice network, may release the TN from the group of allocated TNs and assign the TN to either the group of reserved TNs or the group of available TNs. The TN may be assigned to (associated with) the group of reserved TNs if the timer associated with the TN is active. The TN may be assigned to the group of available TNs if the timer associated with the TN is expired.

Figure 9:
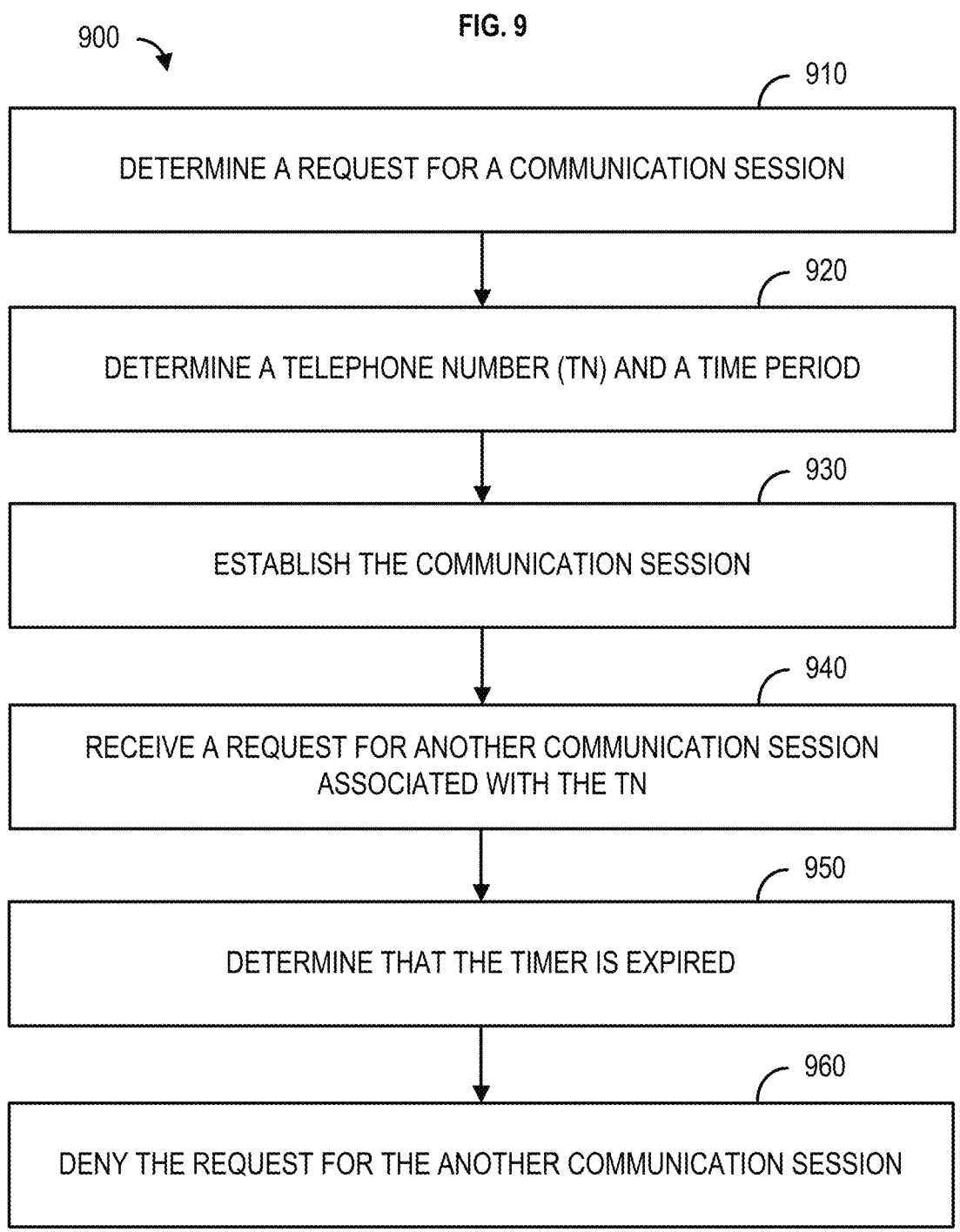
FIG. 9 shows a flowchart of a method for allocating telephone numbers.

FIG. 9 shows a flowchart of a method 900 for allocating telephone numbers (TNs). At 910, a request for a communication session may be determined to include a request for a communication session (e.g., a voice communication session, a call, etc.). A network device (e.g., a voice network server, SIP server, computing device, application server, the network device 106, the network device 202, etc.) associated with a voice network may receive a request for a communication session from a first device (e.g., an internet-of-things (IoT) device, a computing device, a network device, a session initiation protocol (SIP) device, a web real-time communication (webRTC) enabled device, a device not configured for telephony service, the user device 102, the user device 201, etc.). The request for the communication session may include an identifier and/or identification information associated with the first device, such as a session initiation protocol (SIP) uniform resource identifier (URI) and/or any other identifier or identification information. The network device may determine, based on the identifier and/or identification information, that the request for the communication session includes a request for a voice communication session. The request for the communication session comprises a SIP INVITE that includes a TN of a second device and the SIP URI of the first device. As an example, the first device may be a device that is not associated with a static TN and/or a device where telephony service is disabled/inoperative, such as a laptop computer, and a user may need to make a call to an emergency service (e.g., police/fire department, etc.). The first device may be configured with an application that enables voice calls and/or TNs to be dialed during a call, and the call may be routed to and/or facilitated by the network device.

At 920, a TN and a timer may be determined. The network device may determine the TN and the timer based on determining that the request for the communication session includes the request for the voice communication session. The network device request/determine/retrieve the TN from a telephone number (TN) registry (e.g., a server, computing device, database, etc.). The TN registry may store a state of each TN of a group (a plurality) of TNs. The TN registry device may determine if a TN is available for assignment/allocation to a user device (e.g., the first device, etc.), currently assigned/allocated to device, or reserved for a device. An available TN may be any TN from a group of TNs that are available to be assigned/allocated to a user device or reserved for a user device. An assigned/allocated TN may include any TN that is associated with a user device and being used for a current communication (e.g., voice call, etc.). An assigned/allocated TN may be stored with an indication that an identifier of a user device is associated with the TN. A reserved TN may include any TN that has been previously assigned/allocated. A reserved TN may be stored with an indication that an identifier of a user device is associated with the TN. A reserved TN may be temporarily removed from the group (plurality) of TNs, such as for a duration and/or time period during which the TN may not be assigned/allocated to another device.

The TN may be assigned/allocated to the first device from a group of free (e.g., available, unassigned, unreserved, etc.) TN. For example, the network device (and/or the TN registry) may determine that a previous TN is not currently assigned (allocated) to and/or reserved for the first device, and the TN may be assigned/allocated to the first device. Assigning the TN to the first device may associate the TN with the identification information of the first device. The TN may be assigned to the first device based on a timer. While the timer is active the TN may be used to send and/or receive voice calls.

At 930, the communication session may be established. The network device may establish and/or facilitate the communication session based on the TN and the request for the communication session. For example, the network device may send/route the request to communicate to the second device (e.g., a mobile device, a smart device, a communication terminal/device, a telephony-enabled device, the user device 104, the user device 204, etc.). The network device may send/route the SIP INVITE message from the first device to the TN associated with the second device. The communication session may be established the call (communication session request) being answered by the second device.

The communication session may persist until terminated, for example, by the first device or the second device (e.g., a party hanging up the call, etc.). The network device may receive an indication/notification whenever the communication session is terminated. The network device and/or the TN registry, based on the indication/notification that the communication session is terminated, may associate telephone number and the identifier (identifier information) of the first device with a reserved group (plurality) of TNs until the timer expires.

At 940, a request for another communication session may be received. The network device may receive a request for another communication session associated with the TN. The request for the another communication session may be based on the first device attempting to call and/or communicate with the second device or any other device, or any other device attempting to call and/or communicate with the first device, using the TN as a call identifier. For example, the second device (a user of the second device) may attempt to communicate with the first device (the user of the first device) based on the TN, such as the emergency service attempting to callback the user of the first device using the same TN.

At 950, the timer may be determined to be expired. The network device may determine that the timer is expired based on a request for another communication session. The network device may determine, such as by accessing/communicating with the TN registry, that the timer associated with the TN is expired.

At 960, the request for the another communication session may be denied. The network device may deny the request for the another communication session. The request for the another communication session may be denied because the since the timer is expired, the TN is no longer assigned/allocated to the first device, such as the TN no longer being associated with the identifier and/or a\identifier information (e.g., SIP URI, etc.) of the first device.

The network device may determine (at 850) that the timer is expired based on a request for another communication session. The network device, based on determining that the timer is expired may determine if the TN associated with the expired timer has been reassigned or if the TN is associated with the group (plurality) of available TNs. When the time associated with the timer has expired, but the TN has not been reassigned, then the TN may be reassigned to the first device from the group (plurality) of available TNs. When the TN is reassigned to the first device from the group (plurality) of available TNs, the another communication session may be established.

Figure 10:
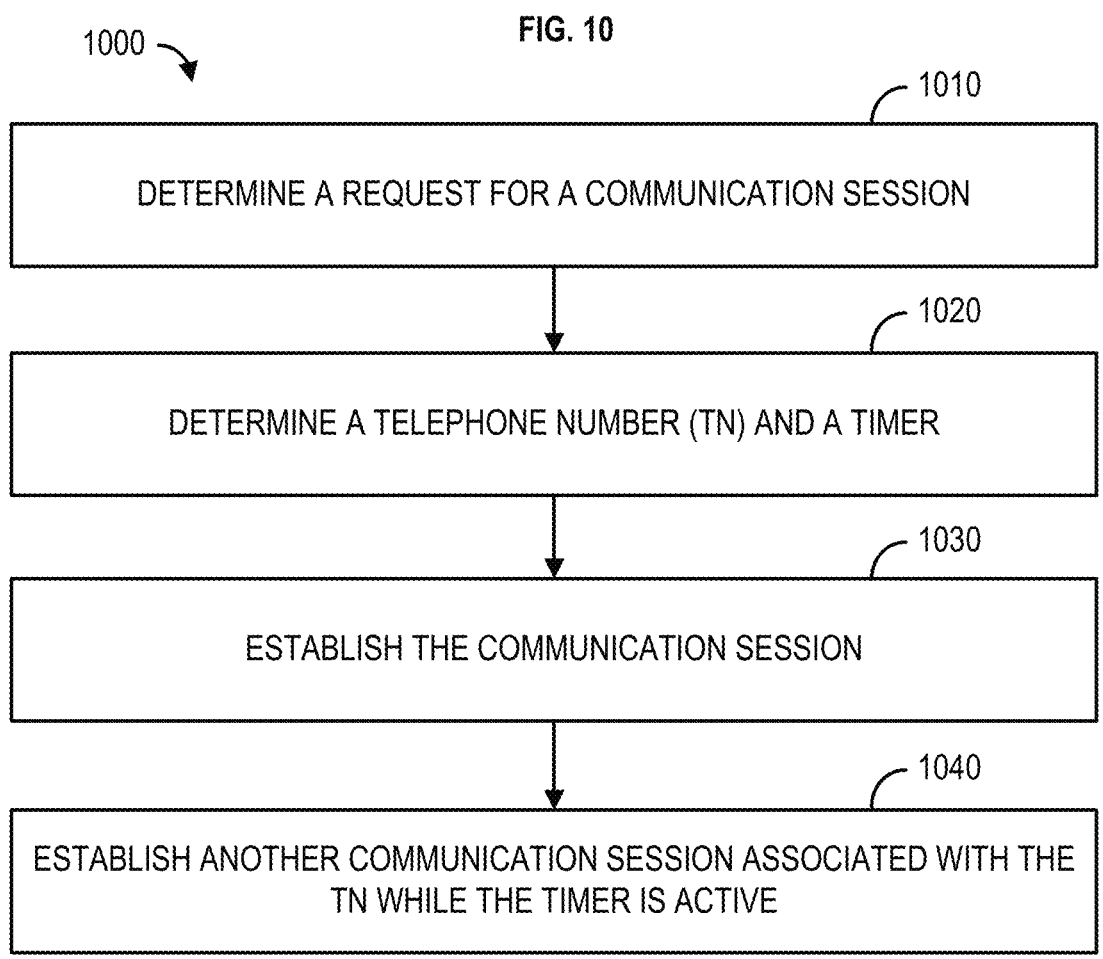
FIG. 10 shows a flowchart of a method for allocating telephone numbers.

FIG. 10 shows a flowchart of a method 1000 for allocating telephone numbers (TNs). At 1010, a request for a communication session may be determined to include a request for a voice communication session. A network device (e.g., a voice network server, SIP server, computing device, application server, the network device 106, the network device 202, etc.) associated with a voice network may receive a request for a communication session from a first device (e.g., an internet-of-things (IoT) device, a computing device, a network device, a session initiation protocol (SIP) device, a web real-time communication (webRTC) enabled device, a device not configured for telephony service, the user device 102, the user device 201, etc.). The request for the communication session may include an identifier and/or identification information associated with the first device, such as a session initiation protocol (SIP) uniform resource identifier (URI) and/or any other identifier or identification information. The network device may determine, based on the identifier and/or identification information, that the request for the communication session includes a request for a voice communication session. The request for the communication session comprises a SIP INVITE that includes a TN of a second device and the SIP URI of the first device. As an example, the first device may be a device that is not associated with a static TN and/or a device where telephony service is disabled/inoperative, such as a laptop computer, and a user may need to make a call to an emergency service (e.g., police/fire department, etc.). The first device may be configured with an application that enables voice calls and/or TNs to be dialed during a call, and the call may be routed to and/or facilitated by the network device.

At 1020, a TN and a timer may be determined. The network device may determine the TN and the timer based on determining that the request for the communication session includes the request for the voice communication session. The network device request/determine/retrieve the TN from a telephone number (TN) registry (e.g., a server, computing device, database, etc.). The TN registry may store a state of each TN of a group (a plurality) of TNs. The TN registry device may determine if a TN is available for assignment/allocation to a user device (e.g., the first device, etc.), currently assigned/allocated to device, or reserved for a device. An available TN may be any TN from a group of TNs that are available to be assigned/allocated to (associated with) a user device or reserved for a user device. An assigned/allocated TN may include any TN that is associated with a user device and being used for a current communication (e.g., voice call, etc.). An assigned/allocated TN may be stored with an indication that an identifier of a user device is associated with the TN. A reserved TN may include any TN that has been previously assigned/allocated. A reserved TN may be stored with an indication that an identifier of a user device is associated with the TN. A reserved TN may be temporarily removed from the group (plurality) of TNs, such as for a duration and/or time period during which the TN may not be assigned/allocated to another user device.

The TN may be assigned/allocated to (associated with) the first device from a group of free (e.g., available, unassigned, unreserved, etc.) TN. For example, the network device (and/or the TN registry) may determine that a previous TN is not currently assigned (allocated) to and/or reserved for the first device, and the TN may be assigned/allocated to the first device. Assigning the TN to the first device may associate the TN with the identification information of the first device. The TN may be assigned to the first device for a while a timer is active. While the timer is active, the TN may be used to send and/or receive voice calls.

At 1030, the communication session may be established. The network device may establish and/or facilitate the communication session based on the TN and the request for the communication session. For example, the network device may send/route, based on assigning the TN and a TN included with the request to communicate, the request to communicate to the second device (e.g., a mobile device, a smart device, a communication terminal/device, a telephony-enabled device, the user device 104, the user device 204, etc.). The network device may send/route the SIP INVITE message from the first device to the TN associated with the second device. The communication session may be established the call (communication session request) being answered by the second device.

The communication session may persist until terminated, for example, by the first device or the second device (e.g., a party hanging up the call, etc.). The network device may receive an indication/notification whenever the communication session is terminated. The network device and/or the TN registry, based on the indication/notification that the communication session is terminated, may associate TN and the identifier (identifier information) of the first device with a reserved group (plurality) of TNs until the timer expires.

At 1040, another communication session may be established. The network device may establish and/or facilitate another communication session with the first device. The network device may receive a request for another communication session associated with the TN. The request for the another communication session may be based on the first device attempting to call and/or communicate with the second device or any other device, or any other device attempting to call and/or communicate with the first device, using the TN as a call identifier. For example, the second device (a user of the second device) may attempt to communicate with the first device (the user of the first device) based on the TN, such as the emergency service attempting to callback the user of the first device using the same TN. The network device may determine that the request for the another communication session occurs timer associated with the TN is active (e.g., the timer is not expired, etc.). The network device may determine, such as by accessing/communicating with the TN registry, that the timer associated with TN is not expired. The network device may establish and/or facilitate the another communication session because while the timer is active the TN may remain assigned/allocated to the first device, such as the TN being associated with the identifier and/or identification information associated with the first device.

Figure 11:
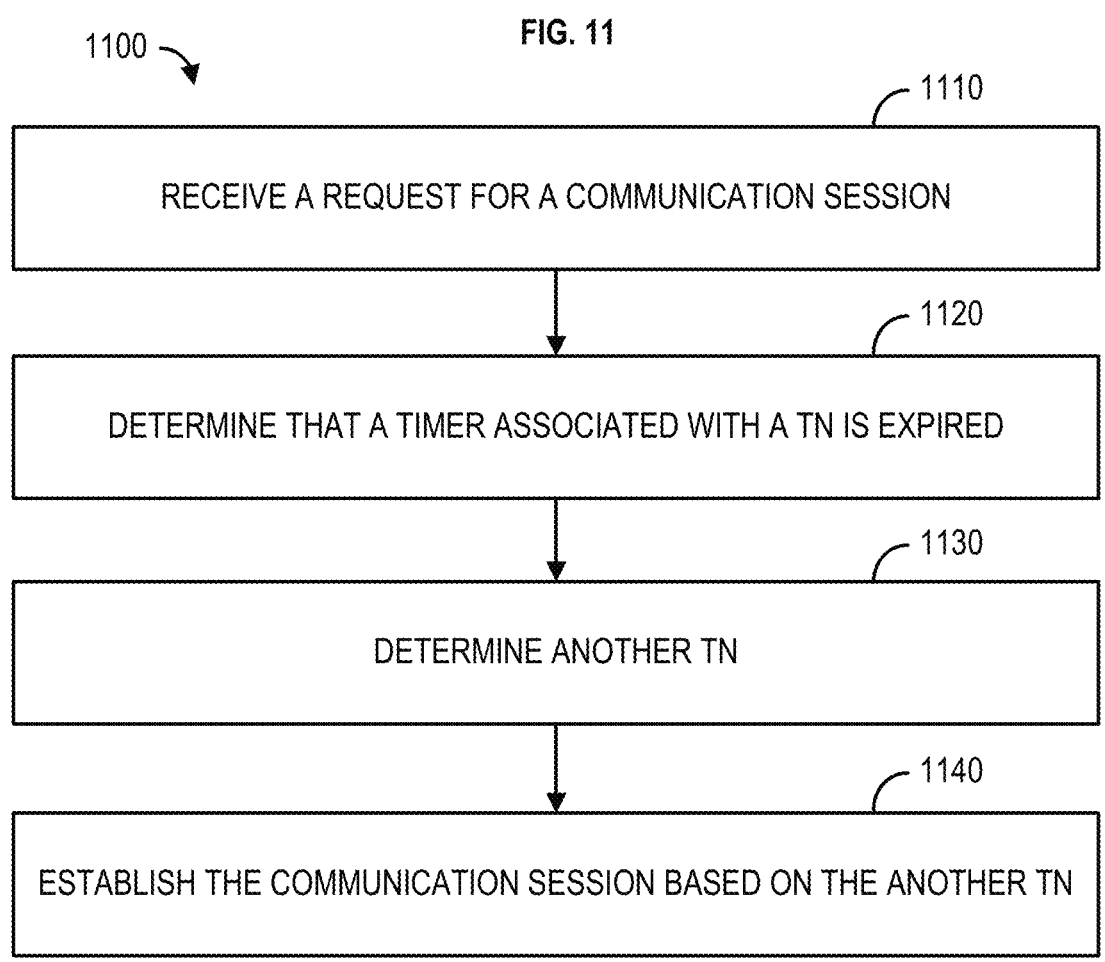
FIG. 11 shows a flowchart of a method for allocating telephone numbers.

FIG. 11 shows a flowchart of a method 1100 for allocating telephone numbers (TNs). At 1110, a request for a communication session may be received. A network device (e.g., a voice network server, SIP server, computing device, application server, the network device 106, the network device 202, etc.) associated with a voice network may receive a request for a communication session from a user device (e.g., an internet-of-things (JOT) device, a computing device, a network device, a session initiation protocol (SIP) device, a web real-time communication (webRTC) enabled device, a device not configured for telephony service, the user device 102, the user device 201, etc.) based on a TN previously assigned/allocated to (associated with) the user device. The TN may have been assigned to the user device while a timer is active. While the timer is active, the TN may be used to send and/or receive voice calls.

The network device may determine TN and timers associated with the TN (such as previously assigned TNs) by accessing/communicating with a telephone number (TN) registry (e.g., a server, computing device, database, the TN registry device 107, the TN registry 203, etc.). The TN registry may store a state of each TN of a group (a plurality) of TNs. The TN registry device may determine if a TN is available for assignment/allocation to a user device, currently assigned/allocated to a user device, or reserved for a user device. An available TN may be any TN from a group of TNs that are available to be assigned/allocated to a user device or reserved for a user device. An assigned/allocated TN may include any TN that is associated with a user device and being used for a current communication (e.g., voice call, etc.). An assigned/allocated TN may be stored with an indication that an identifier of a user device is associated with the TN. A reserved TN may include any TN that has been previously assigned/allocated. A reserved TN may be stored with an indication that an identifier of a user device is associated with the TN. A reserved TN may be temporarily removed from the group (plurality) of TNs, such as for a duration and/or time period during which the TN may not be assigned/allocated to another user device.

At 1120, a timer associated with the previously associated TN may be determined to be expired. The network device may determine that a timer associated with the previously associated TN is expired. For example, the network device may access/communicate with the TN registry to determine a state of the previously assigned TN. The state of the previously assigned TN may indicate that a timer (a timer period during which a TN is reserved for a user device) associated with the previously associated TN is expired.

At 1130, another TN may be determined. The network device may determine another TN based on determining the timer is expired. For example, another TN may be associated with a group (plurality) of TNs available to be assigned/reassigned to user device. The network device may access/communicate with the TN registry to determine the another TN.

At 1140, the communication session may be established. The network device may establish and/or facilitate the communication session. The network device may send/route, based on assigning the another TN and a TN included with the request for the communication session. For example, the network device, based on the another TN, may send/route a SIP INVITE message from the user device to another user device associated with a TN included with the request for the communication session to establish the communication session.

Figure 12:
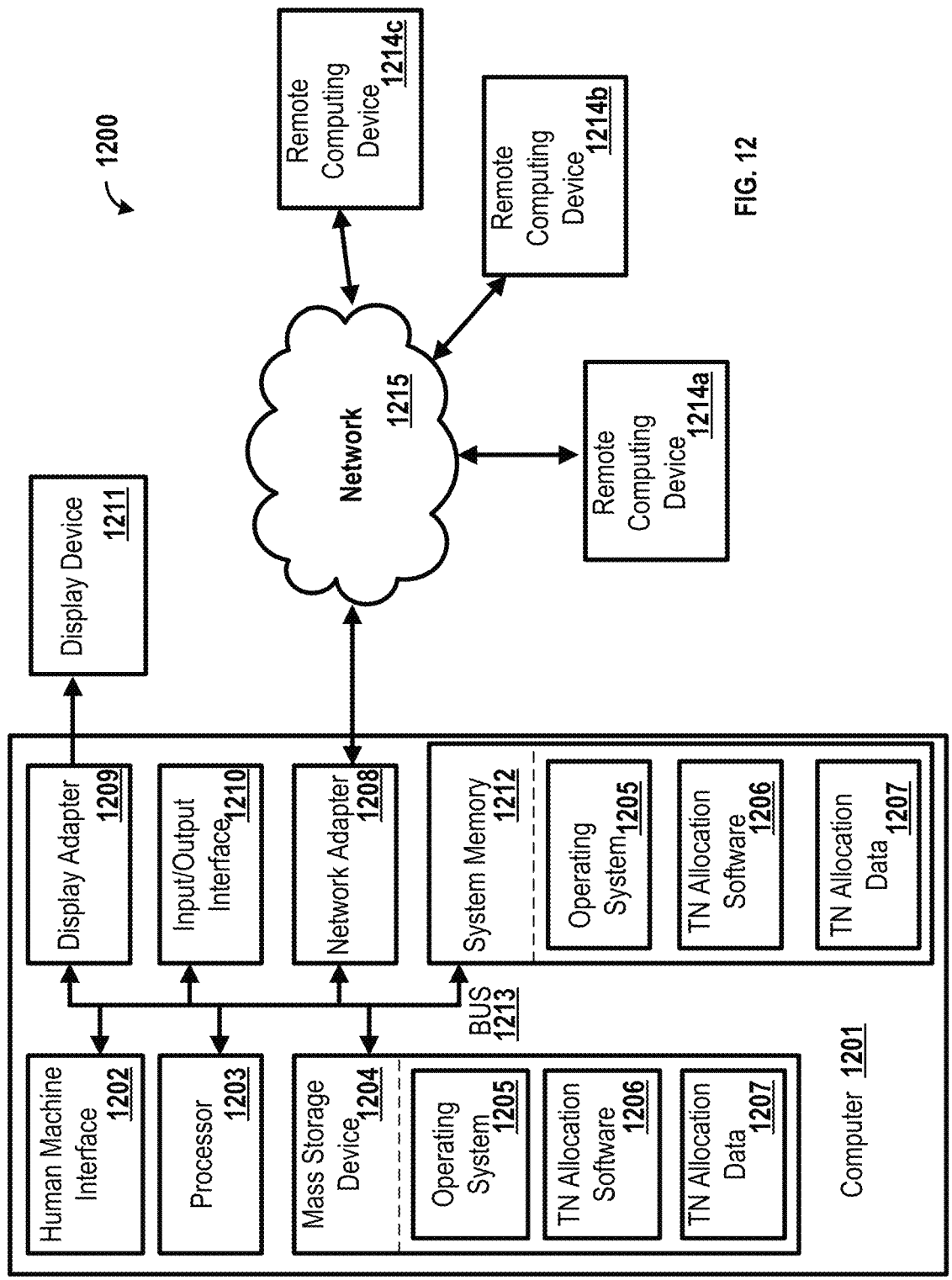
FIG. 12 shows a block diagram of a computing device for implementing the allocation of telephone numbers.

FIG. 12 shows a system 1200 for implementing telephone number allocations. Any device/component described herein may be a computer 1201 as shown in FIG. 12.

The computer 1201 may comprise one or more processors 1203, a system memory 1212, and a bus 1213 that couples various components of the computer 1201 including the one or more processors 1203 to the system memory 1212. In the case of multiple processors 1203, the computer 1201 may utilize parallel computing.

The bus 1213 may comprise one or more of several possible types of bus structures, such as a memory bus, memory controller, a peripheral bus, an accelerated graphics port, and a processor or local bus using any of a variety of bus architectures.

The computer 1201 may operate on and/or comprise a variety of computer-readable media (e.g., non-transitory). Computer-readable media may be any available media that is accessible by the computer 1201 and comprises, non-transitory, volatile and/or non-volatile media, removable and non-removable media. The system memory 1212 has computer-readable media in the form of volatile memory, such as random access memory (RAM), and/or non-volatile memory, such as read-only memory (ROM). The system memory 1212 may store data such as TN allocation data 1207 and/or program modules such as operating system 1205 and TN allocation software 1206 that are accessible to and/or are operated on by the one or more processors 1203.

The computer 1201 may also comprise other removable/non-removable, volatile/non-volatile computer storage media. The mass storage device 1204 may provide non-volatile storage of computer code, computer-readable instructions, data structures, program modules, and other data for the computer 1201. The mass storage device 1204 may be a hard disk, a removable magnetic disk, a removable optical disk, magnetic cassettes or other magnetic storage devices, flash memory cards, CD-ROM, digital versatile disks (DVD) or other optical storage, random access memories (RAM), read-only memories (ROM), electrically erasable programmable read-only memory (EEPROM), and the like.

Any number of program modules may be stored on the mass storage device 1204. An operating system 1205 and TN allocation software 1206 may be stored on the mass storage device 1204. One or more of the operating system 1205 and TN allocation software 1206 (or some combination thereof) may comprise program modules and the TN allocation software 1206. TN allocation data 1207 may also be stored on the mass storage device 1204. TN allocation data 1207 may be stored in any of one or more databases known in the art. The databases may be centralized or distributed across multiple locations within the network 1215.

A user may enter commands and information into the computer 1201 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 1203 via a human-machine interface 1202 that is coupled to the bus 1213, but may be connected by other interface and bus structures, such as a parallel port, game port, an IEEE 1394 Port (also known as a Firewire port), a serial port, network adapter 1208, and/or a universal serial bus (USB).

A display device 1211 may also be connected to the bus 1213 via an interface, such as a display adapter 1209. It is contemplated that the computer 1201 may have more than one display adapter 1209 and the computer 1201 may have more than one display device 1211. A display device 1211 may be a monitor, an LCD (Liquid Crystal Display), light-emitting diode (LED) display, television, smart lens, smart glass, and/or a projector. In addition to the display device 1211, other output peripheral devices may comprise components such as speakers (not shown) and a printer (not shown) which may be connected to the computer 1201 via Input/Output Interface 1210. Any step and/or result of the methods may be output (or caused to be output) in any form to an output device. Such output may be any form of visual representation, including, but not limited to, textual, graphical, animation, audio, tactile, and the like. The display 1211 and computer 1201 may be part of one device, or separate devices.

The computer 1201 may operate in a networked environment using logical connections to one or more remote computing devices 1214a,b,c. A remote computing device 1214a,b,c may be a personal computer, computing station (e.g., workstation), portable computer (e.g., laptop, mobile phone, tablet device), smart device (e.g., smartphone, smartwatch, activity tracker, smart apparel, smart accessory), security and/or monitoring device, a server, a router, a network computer, a peer device, edge device or other common network nodes, and so on. Logical connections between the computer 1201 and a remote computing device 1214a,b,c may be made via a network 1215, such as a local area network (LAN) and/or a general wide area network (WAN). Such network connections may be through a network adapter 1208. A network adapter 1208 may be implemented in both wired and wireless environments. Such networking environments are conventional and commonplace in dwellings, offices, enterprise-wide computer networks, intranets, and the Internet.

Application programs and other executable program components such as the operating system 1205 are shown herein as discrete blocks, although it is recognized that such programs and components may reside at various times in different storage components of the computing device 1201, and are executed by the one or more processors 1203 of the computer 1201. An implementation of TN allocation software 1206 may be stored on or sent across some form of computer-readable media. Any of the disclosed methods may be performed by processor-executable instructions embodied on computer-readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
   receiving, from a network, a request for a telephone number, wherein the request comprises an identifier of a user device associated with a requested communication session;
   determining a telephone number from a group of available telephone numbers;
   sending, to the network, the telephone number;
   associating the telephone number with a group of allocated telephone numbers, wherein the group of allocated telephone numbers comprises telephone numbers that are in use by a user device for a communication session; and
   associating, based on an indication that the requested communication session is terminated, the telephone number with a group of reserved telephone numbers for a time period, wherein the group of reserved telephone numbers comprises telephone numbers that are associated with a user device for a time period after a communication session and are removed from the group of allocated telephone numbers, and wherein during the time period the telephone number may be used for one or more communication sessions associated with the identifier.

2. The method of claim 1, wherein determining the telephone number from the group of available telephone numbers comprises determining that the telephone number is a next telephone number in a cycle of telephone numbers within the group of available telephone numbers, wherein the cycle comprises at least one of: a first-in-first-out (FIFO) cycle of the telephone numbers within the group of available telephone numbers, a last-in-first-out (LIFO) cycle of the telephone numbers within the group of available telephone numbers, or a round-robin cycle of the telephone numbers within the group of available telephone numbers.

3. The method of claim 1, wherein associating the telephone number with the group of allocated telephone numbers comprises storing an indication that the identifier is associated with the telephone number.

4. The method of claim 1, wherein the group of allocated telephone numbers further comprises telephone numbers that are removed from one or more of the group of available telephone numbers or the group of reserved telephone numbers.

5. The method of claim 1, wherein the group of reserved telephone numbers further comprises telephone numbers that were previously used by a user device for another communication session.

6. The method of claim 1, wherein associating the telephone number with the group of reserved telephone numbers comprises storing an indication that the identifier is associated with the telephone number that is associated with the time period.

7. The method of claim 1, further comprising:
receiving, from the network, another request for a telephone number, wherein the another request comprises the identifier of the user device;
determining, based on the identifier, that the identifier is associated with the telephone number assigned to the group of reserved telephone numbers;
sending, to the network, the telephone number; and
associating the telephone number with the group of allocated telephone numbers.

8. The method of claim 1, wherein the one or more communication sessions comprise one or more communication sessions initiated by the user device and one or more communication sessions initiated by another user device.

9. The method of claim 1, further comprising:
determining, based on an indication that another communication session associated with the telephone number is terminated, a status of the time period;
associating the telephone number with the group of reserved telephone numbers if the status of the time period indicates that the time period is active; and
associating the telephone number with the group of available telephone numbers if the status of the time period indicates that the time period is expired.

10. A method comprising:
receiving, from a network, a request for an identifier of a user device, wherein the request comprises a telephone number associated with the user device associated with a communication session;
determining, based on the telephone number, the identifier, wherein the identifier is associated with the telephone number in a group of reserved telephone numbers, wherein the group of reserved telephone numbers comprises telephone numbers that are removed from a group of allocated telephone numbers;
sending, based on a timer associated with the telephone number being active, the identifier to the network; and
associating the telephone number with the group of allocated telephone numbers, wherein the group of allocated telephone numbers comprises telephone numbers that are in use by a user device for a communication session.

11. The method of claim 10, wherein determining the identifier comprises determining, based on a stored indication that the telephone number is associated with the identifier, the identifier.

12. The method of claim 10, wherein the timer is associated with a time period, wherein the method further comprises:
reserving, during the time period, the telephone number for one or more communication sessions associated with the identifier, and
associating, after the time period, the telephone number with a group of available telephone numbers.

13. The method of claim 10, further comprising determining, based on the telephone number, that the timer is active.

14. The method of claim 10, wherein assigning the telephone number to the group of allocated telephone numbers comprises storing an indication that the identifier is associated with the telephone number.

15. The method of claim 10, further comprising:
determining, based on an indication that another communication session associated with the telephone number is terminated, a status of the timer;
associating the telephone number with the group of reserved telephone numbers if the status of the timer indicates that the timer is active; and
associating the telephone number with a group of available telephone numbers if the status of the timer indicates that the timer is expired.

16. A method comprising:
sending, by a network based on a time period a telephone number is associated with an identifier of a first device in a group of reserved telephone numbers at a telephone number registry, a request for a telephone number, wherein the request comprises the identifier of the first device, and wherein the group of reserved telephone numbers comprises telephone numbers that are removed from a group of allocated telephone numbers;
receiving, from the telephone number registry, the telephone number associated with the identifier of the first device at the telephone number registry;
establishing, based on the telephone number, a communication session between the first device and a second device;
associating, based on the communication session, the telephone number with the group of allocated telephone numbers;
determining that the communication session is terminated; and
sending, based on termination of the communication session, an indication configured to cause the telephone number registry to release the telephone number to a group of available telephone numbers.

17. The method of claim 16, wherein the telephone number is associated with the identifier of the first device at the telephone number registry based on the telephone number being assigned to the group of reserved telephone numbers.

18. The method of claim 17, wherein the group of reserved telephone numbers further comprises telephone numbers that were previously used by a user device for another communication session.

19. The method of claim 16, wherein the indication configured to cause the telephone number registry to release the telephone number is further configured to cause the telephone number registry to associate the telephone number with the group of available telephone numbers or the group of reserved telephone numbers.

20. The method of claim 16, wherein determining that the communication session is terminated is based on an indication from one or more of the first device or the second device that the communication session is terminated.

* * * * *